US011330795B2

(12) United States Patent
Becattini, Jr. et al.

(10) Patent No.: US 11,330,795 B2
(45) Date of Patent: May 17, 2022

(54) ELONGATED SLOW FEEDING DEVICE

(71) Applicant: Towerstar Pets, LLC, Malvern, PA (US)

(72) Inventors: Fernando Becattini, Jr., Malvern, PA (US); Jacquelyn N. Becattini, Malvern, PA (US); Fernando Becattini, Sr., Devon, PA (US); John D. Fiegener, Marblehead, MA (US); William P. Liteplo, Middleton, MA (US)

(73) Assignee: TOWERSTAR PETS, LLC, Malvern, PA (US)

( * ) Notice: Subject to any disclaimer, the term of this patent is extended or adjusted under 35 U.S.C. 154(b) by 820 days.

(21) Appl. No.: 16/223,636

(22) Filed: Dec. 18, 2018

(65) Prior Publication Data

US 2019/0281788 A1    Sep. 19, 2019

Related U.S. Application Data

(60) Provisional application No. 62/644,106, filed on Mar. 16, 2018.

(51) Int. Cl.
*A01K 5/01* (2006.01)

(52) U.S. Cl.
CPC ................... *A01K 5/0114* (2013.01)

(58) Field of Classification Search
CPC ...... A01K 5/0114; A01K 5/0135; A01K 5/00; A01K 5/0275; A01K 5/0142
USPC ....................... 119/61.5, 51.01, 61.53, 61.57
See application file for complete search history.

(56) References Cited

U.S. PATENT DOCUMENTS

| 75,673 | A | 3/1868 | Gibson |
| 472,316 | A | 4/1892 | Smith |
| 495,872 | A | 5/1893 | Ball |
| 1,900,290 | A | 3/1933 | Kudo |
| 2,097,356 | A | 10/1937 | Truesdale |
| D107,317 | S | 12/1937 | Murguiondo |
| 2,537,915 | A | 1/1951 | Roop |
| 2,554,086 | A | 5/1951 | Block |

(Continued)

OTHER PUBLICATIONS

Brake-Fast Dog Food Slow Feed Bowl—Medium Blue by Brake-fast, LLC, https://www.amazon.com/Brake-Fast-Food-Slow-Feed-Bowl/dp/B01MDQJ2SA/ref=sr_1_5?s=pet-supplies&ie=UTF8&qid=1521554223&sr=1-5&keywords=brake-fast, accessed Mar. 20, 2018, 5 pages.

(Continued)

*Primary Examiner* — Yvonne R Abbott-Lewis
(74) *Attorney, Agent, or Firm* — Sand, Sebolt & Wernow Co., LPA

(57) ABSTRACT

A feeding device including a base with at least one leg extending downwardly from the base to support the base above a surface; a feeding chamber defined in the base; and a plurality of obstructions extending upwardly into the feeding chamber. A removable liner may be nestingly engaged with the base. The liner may include a second feeding chamber and the plurality of obstructions extending upwardly into the second feeding chamber. The method of feeding an animal may include arranging pieces of food within a feeding chamber according to a random distribution pattern; placing the feeding chamber within reach of an animal to be fed; and obstructing the animal from simultaneously locating all pieces of food within the feeding chamber while feeding using obstructions arranged in a pattern.

24 Claims, 15 Drawing Sheets

(56) References Cited

U.S. PATENT DOCUMENTS

| | | | |
|---|---|---|---|
| D187,440 S | 3/1960 | Tupper | |
| D190,839 S | 7/1961 | Voigtmann | |
| D191,058 S | 8/1961 | Jones | |
| D200,558 S | 3/1965 | Davis | |
| D202,529 S | 10/1965 | Rosebrook | |
| D202,838 S | 11/1965 | Brand | |
| D221,099 S | 7/1971 | Alparone | |
| 3,683,938 A | 8/1972 | Rowland | |
| 3,722,476 A | 3/1973 | Van Ness et al. | |
| D226,838 S | 5/1973 | Ruskin | |
| 3,782,582 A | 1/1974 | Lybbert et al. | |
| 3,838,772 A | 10/1974 | Lang et al. | |
| 3,883,037 A | 5/1975 | Seiller | |
| 3,958,504 A | 5/1976 | Levin | |
| D241,109 S | 8/1976 | Levin | |
| D249,269 S | 9/1978 | Pitts | |
| 4,127,189 A | 11/1978 | Shumrak | |
| 4,208,836 A | 6/1980 | Kramer | |
| 4,296,682 A | 10/1981 | Thompson | |
| 4,307,835 A | 12/1981 | Roccaforte | |
| D267,221 S | 12/1982 | Williams | |
| D271,769 S | 12/1983 | Daenen et al. | |
| 4,442,969 A | 4/1984 | Holden | |
| D274,781 S | 7/1984 | Baker et al. | |
| 4,464,405 A | 8/1984 | De Christopher | |
| D279,945 S | 8/1985 | Zeischegg et al. | |
| D281,696 S | 12/1985 | Barnhart | |
| D283,496 S | 4/1986 | Pisarkiewicz | |
| 4,658,759 A * | 4/1987 | Brown | A01K 5/0114 119/61.5 |
| D304,536 S | 11/1989 | Blaser | |
| D309,234 S | 7/1990 | Howell | |
| D318,281 S | 7/1991 | McKinlay | |
| D320,994 S | 10/1991 | Kafka et al. | |
| 5,094,032 A | 3/1992 | Byland et al. | |
| 5,499,763 A | 3/1996 | DeMars | |
| D383,032 S | 9/1997 | Hollinger | |
| D399,787 S | 10/1998 | Wagner | |
| D406,595 S | 3/1999 | Tunzi | |
| D418,367 S | 1/2000 | Thomas | |
| D449,137 S | 10/2001 | Newman | |
| 6,539,893 B1 | 4/2003 | Otto-Lubker et al. | |
| D477,171 S | 7/2003 | Gabbour | |
| D485,208 S | 1/2004 | Fan | |
| D490,745 S | 6/2004 | Fan | |
| D497,077 S | 10/2004 | de Groote | |
| D513,150 S | 12/2005 | Asner | |
| D531,081 S | 10/2006 | Fan | |
| 7,207,291 B1 | 4/2007 | Watts | |
| D543,413 S | 5/2007 | Henry et al. | |
| D560,695 S | 1/2008 | Marchionda | |
| D563,608 S * | 3/2008 | Kitchen | A01K 5/0114 D30/129 |
| 7,341,019 B1 * | 3/2008 | Tsengas | A01K 5/0114 119/61.5 |
| D586,830 S * | 2/2009 | de Groote | D15/90 |
| D590,109 S | 4/2009 | Anderson et al. | |
| D600,861 S | 8/2009 | Sin | |
| D604,100 S | 11/2009 | Mishan | |
| 7,669,721 B2 | 3/2010 | Kemper et al. | |
| 7,895,975 B2 | 3/2011 | Markham | |
| D636,944 S | 4/2011 | Anderson et al. | |
| D645,274 S | 9/2011 | Terada | |
| D648,904 S | 11/2011 | Tedaldi et al. | |
| D651,450 S | 1/2012 | Pallotto | |
| D654,230 S | 2/2012 | Tedaldi et al. | |
| D667,681 S | 9/2012 | Carsten | |
| D676,470 S * | 2/2013 | Norin | D15/90 |
| 8,516,975 B2 * | 8/2013 | Becattini, Jr. | A01K 7/005 119/61.54 |
| D689,746 S | 9/2013 | Zorovich et al. | |
| 8,534,225 B2 | 9/2013 | Vermeegen | |
| D698,095 S | 1/2014 | Paculdo | |
| D698,096 S | 1/2014 | Paculdo | |
| D699,009 S | 2/2014 | Hansen et al. | |
| 8,651,055 B2 | 2/2014 | Dreger | |
| D705,999 S | 5/2014 | Hansen et al. | |
| D706,000 S | 5/2014 | Martinez et al. | |
| D706,001 S | 5/2014 | Hansen | |
| D706,493 S * | 6/2014 | Hansen | D30/121 |
| D706,494 S | 6/2014 | Hansen | |
| D706,495 S * | 6/2014 | Hansen | D30/121 |
| 8,844,466 B2 | 9/2014 | Vermeegen | |
| 8,899,180 B2 * | 12/2014 | Lindskov | A01K 5/0114 119/61.1 |
| 8,919,288 B2 | 12/2014 | Ressemann et al. | |
| 8,961,163 B2 | 2/2015 | Zorovich et al. | |
| D723,759 S | 3/2015 | Evans et al. | |
| D731,262 S | 6/2015 | Zila | |
| D731,263 S | 6/2015 | Zila | |
| D732,421 S | 6/2015 | Cordova | |
| D741,024 S | 10/2015 | Liu | |
| 9,179,644 B2 * | 11/2015 | Qiu | A01K 5/0114 |
| D747,131 S | 1/2016 | Takayama | |
| 9,241,777 B2 | 1/2016 | Ressemann et al. | |
| D750,452 S | 3/2016 | Liberman | |
| 9,402,370 B2 | 8/2016 | Lindskov et al. | |
| D769,546 S * | 10/2016 | Hansen | D30/121 |
| 9,545,081 B2 | 1/2017 | Nolan | |
| D787,568 S * | 5/2017 | Davies | D15/90 |
| D793,171 S | 8/2017 | Boytor, II | |
| D804,237 S | 12/2017 | Takayama | |
| D807,642 S * | 1/2018 | Greenwood | D3/313 |
| D819,278 S | 5/2018 | Wantanabe | |
| D830,097 S | 10/2018 | Takayama | |
| D833,086 S * | 11/2018 | Hansen | D30/121 |
| D847,222 S | 4/2019 | Todirca et al. | |
| D851,337 S | 6/2019 | Tajima | |
| D852,237 S | 6/2019 | Helton | |
| D852,854 S | 7/2019 | Helton | |
| D853,053 S | 7/2019 | O'Donnell et al. | |
| D856,604 S * | 8/2019 | Peart | D30/129 |
| D857,307 S * | 8/2019 | Miyawaki | D30/129 |
| D861,995 S * | 10/2019 | Lentz | D30/121 |
| D863,868 S | 10/2019 | Lv | |
| D874,071 S * | 1/2020 | Gevaert | D30/129 |
| D884,288 S | 5/2020 | O'Donnell et al. | |
| D885,687 S * | 5/2020 | Daymont | D30/129 |
| D895,216 S | 9/2020 | Becattini, Jr. et al. | |
| D895,906 S | 9/2020 | Becattini, Jr. et al. | |
| D902,500 S * | 11/2020 | Glinsky | D30/129 |
| D910,932 S * | 2/2021 | Hu | D30/129 |
| D927,797 S * | 8/2021 | Sharer | D30/130 |
| D937,499 S * | 11/2021 | Paucar | D30/121 |
| D940,966 S * | 1/2022 | Murphy | D30/130 |
| 2002/0017056 A1 | 2/2002 | Fan | |
| 2002/0185073 A1 | 12/2002 | Fullerton et al. | |
| 2005/0039689 A1 | 2/2005 | Mossmer | |
| 2006/0005774 A1 * | 1/2006 | Newman Bornhofen | A01K 5/0135 119/61.5 |
| 2006/0213447 A1 * | 9/2006 | Kitchen | A01K 5/0114 119/61.5 |
| 2008/0053374 A1 | 3/2008 | Kerrigan et al. | |
| 2008/0072829 A1 | 3/2008 | Kerrigan et al. | |
| 2008/0141945 A1 | 6/2008 | Markham | |
| 2009/0025644 A1 | 1/2009 | Ebert | |
| 2009/0126641 A1 * | 5/2009 | Anderson | A01K 5/0114 119/61.5 |
| 2010/0003374 A1 | 1/2010 | Hachmann | |
| 2010/0012042 A1 | 1/2010 | Lee | |
| 2011/0308470 A1 | 12/2011 | Vermeegen | |
| 2012/0174874 A1 | 7/2012 | Ottosson | |
| 2013/0125823 A1 | 1/2013 | Simon et al. | |
| 2013/0129890 A1 | 5/2013 | Cox | |
| 2014/0060442 A1 | 3/2014 | Ressemann et al. | |
| 2014/0158054 A1 | 6/2014 | Clarke et al. | |
| 2014/0196671 A1 | 7/2014 | Taylor | |
| 2015/0068461 A1 * | 3/2015 | Lindskov | A01K 5/00 119/51.01 |
| 2016/0255813 A1 | 9/2016 | Wolfe, Jr. et al. | |
| 2017/0112093 A1 * | 4/2017 | Glinsky | A01K 5/0291 |
| 2017/0348082 A1 | 12/2017 | Ogleby | |
| 2018/0133991 A1 | 5/2018 | Tsengas | |

(56) References Cited

U.S. PATENT DOCUMENTS

| | | | |
|---|---|---|---|
| 2018/0352782 A1* | 12/2018 | Miller | A01K 5/0114 |
| 2018/0368357 A1 | 12/2018 | Yang et al. | |
| 2019/0208744 A1* | 7/2019 | Lentz | A01K 5/0121 |
| 2019/0281788 A1 | 9/2019 | Becattini, Jr. et al. | |
| 2019/0380302 A1* | 12/2019 | Northrop | A01K 5/0114 |
| 2021/0059212 A1* | 3/2021 | Lentz | A01K 5/0135 |

OTHER PUBLICATIONS

Outward Hound Fun Feeder Slow Feed Interactive Bloat Stop Dog Bowl, https://www.amazon.com/Feeder-Bloat-Outward-Hound-Large/dp/B00FPKNRF0/ref=sr_1_1_sspa?s=pet-supplies&ie=UTF8&qid=1521552951&sr=1-1-spons&keywords=outward+hound&psc=1, accessed Mar. 20, 2018, 10 pages.

Outward Hound 3in1 Up Feeder Elevated Raised Slow Feed Prevent Bloat Dog Bowk, https://www.amazon.com/Outward-Hound-51011-Elevated-Prevent/dp/B01AS1MUQ2/ref=sr_1_1_sspa?s=pet-supplies&ie=UTF8&qid=1521554289&sr=1-1-spons&keywords=outward+hound+elevated&psc=1&smid=A1V2OAHRMHBI06, accessed Mar. 20, 2018, 8 pages.

Outward Hound Fun Mat Slow Portable Dog Feeder Bowl, https://www.amazon.com/Portable-Feeder-Outward-Hound-Green/dp/B01N2BEPD8/ref-sr_1_1_sspa?s-pet-supplies&ie-UTF8&qid-1521554366&sr-1-1-spons&keywords=outward+hound+fun+mat&psc=1, accessed Mar. 20, 2018, 8 pages.

The Company of Animals—Northmate Interactive Cat Feeder—Slow Feed Bowl, https://www.amazon.com/dp/B009CKHXYU/ref=twister_B0791KSXPF, accessed Mar. 20, 2018, 9 pages.

* cited by examiner

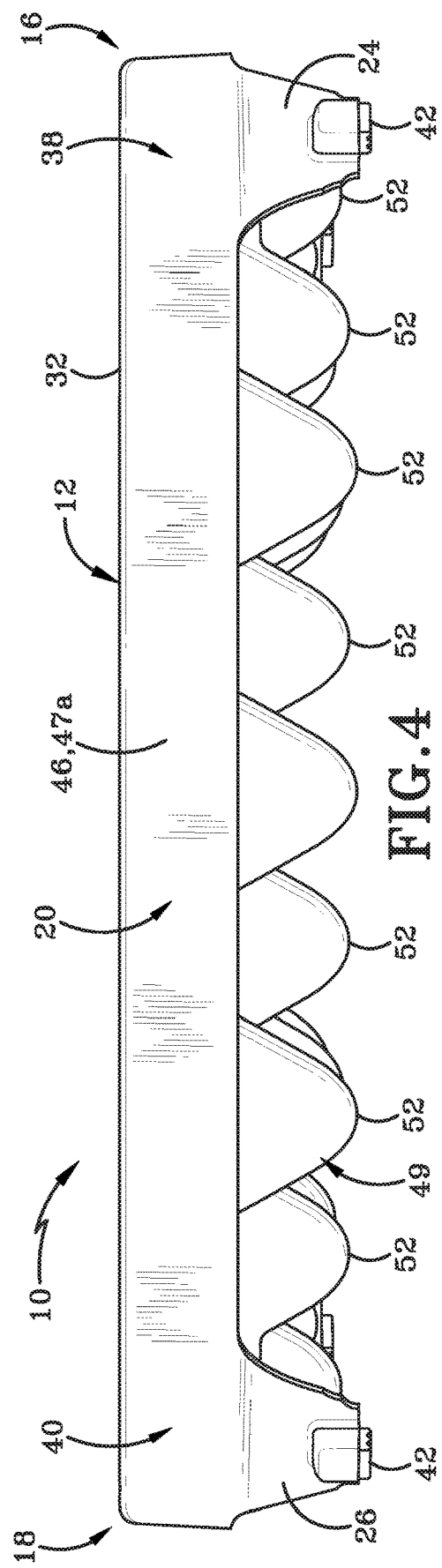
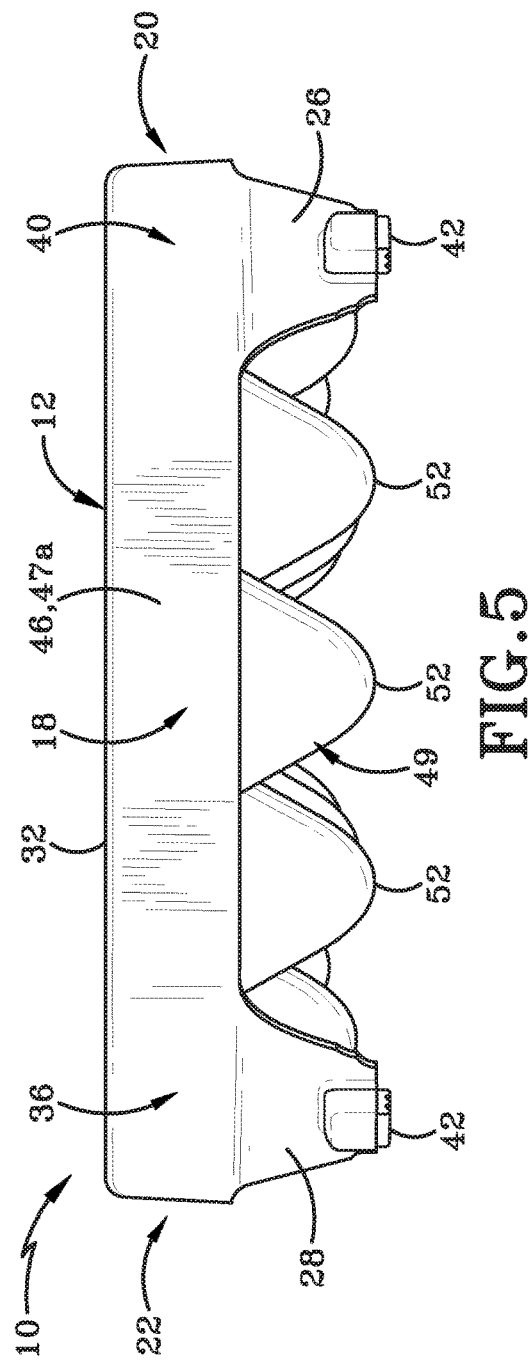

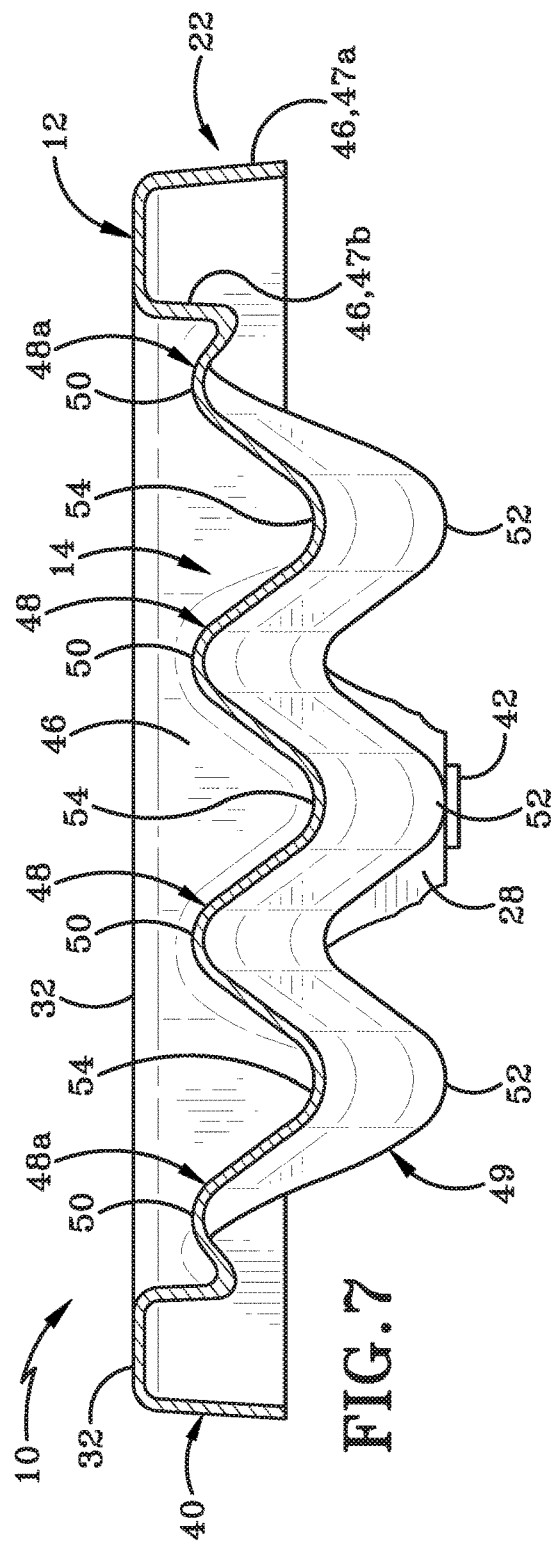
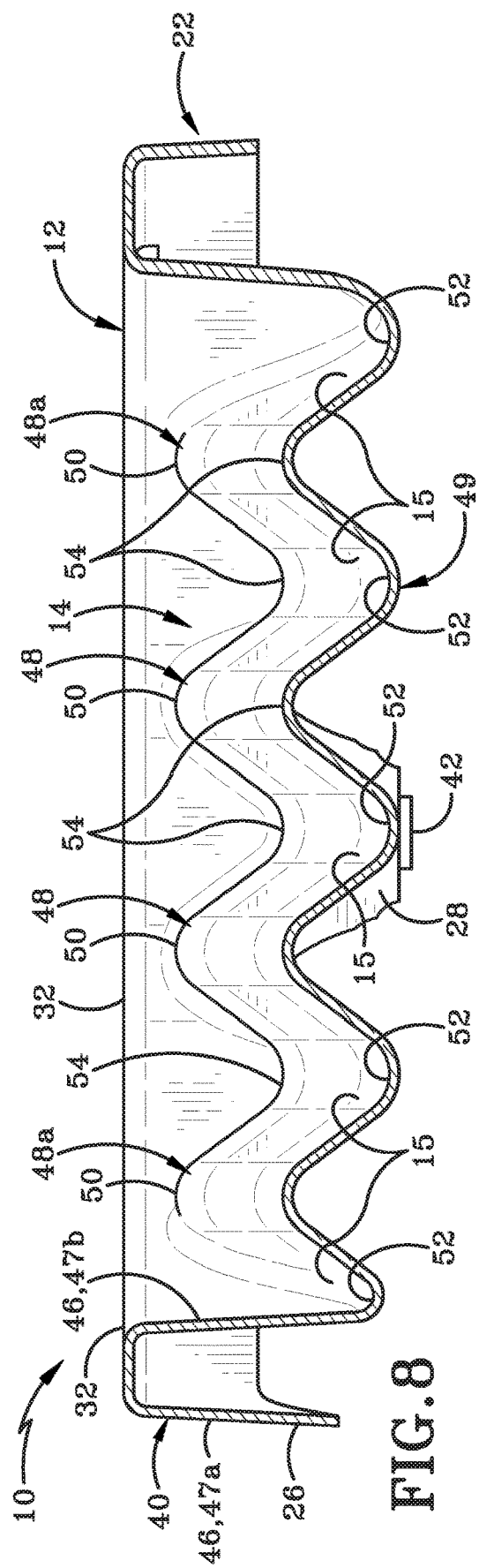

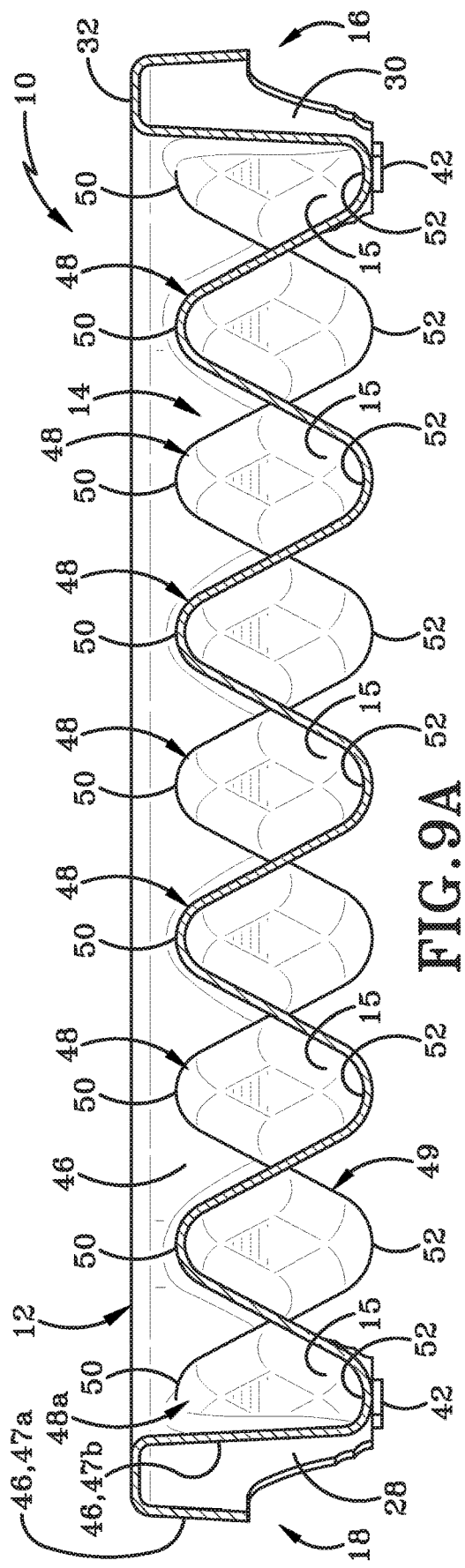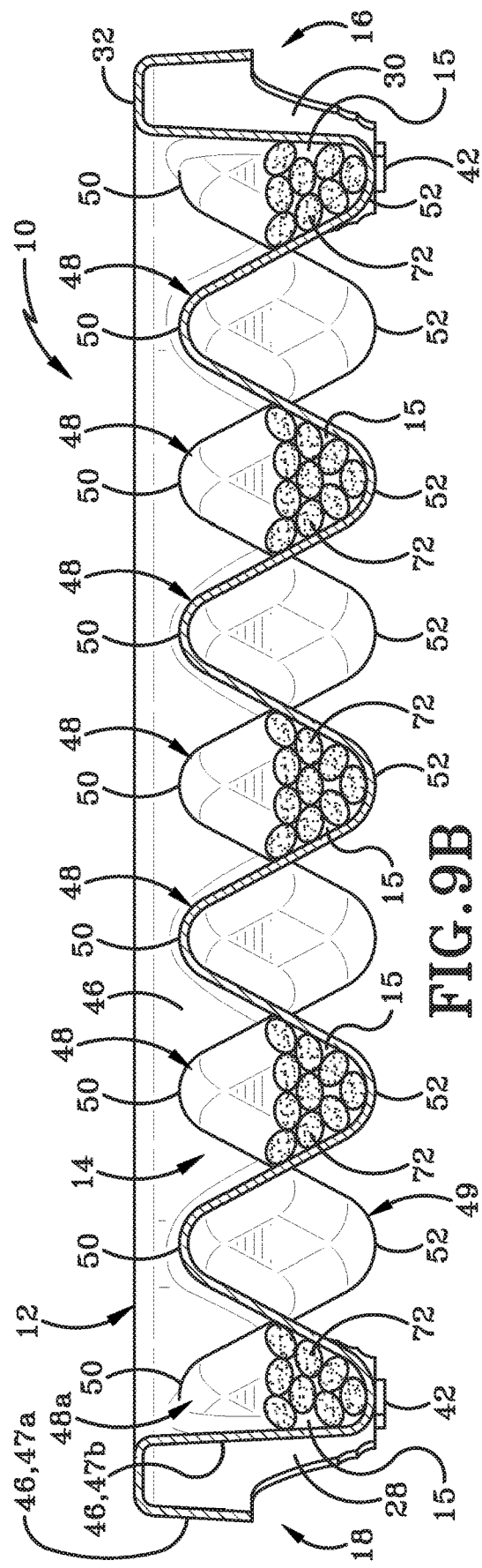

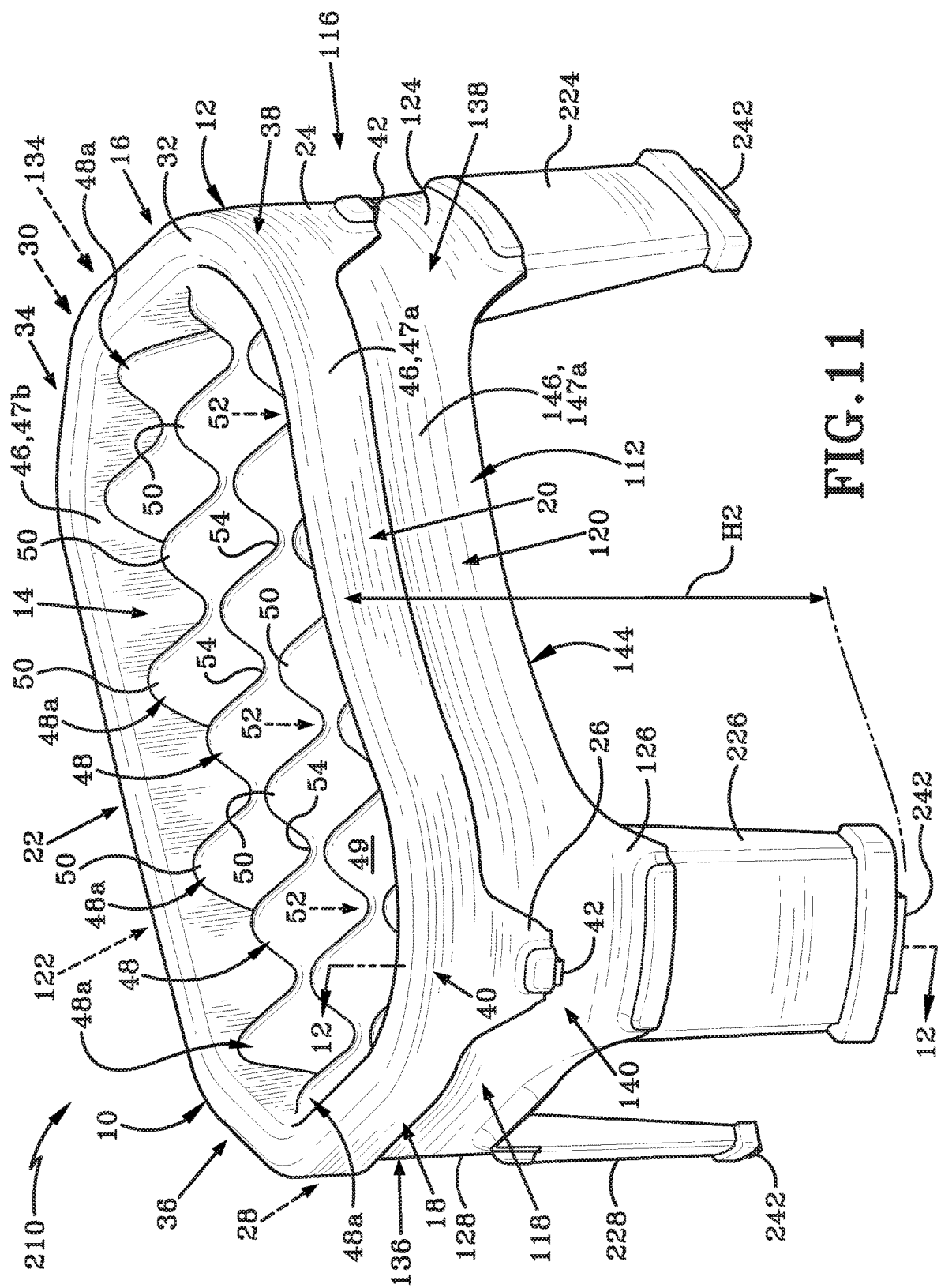

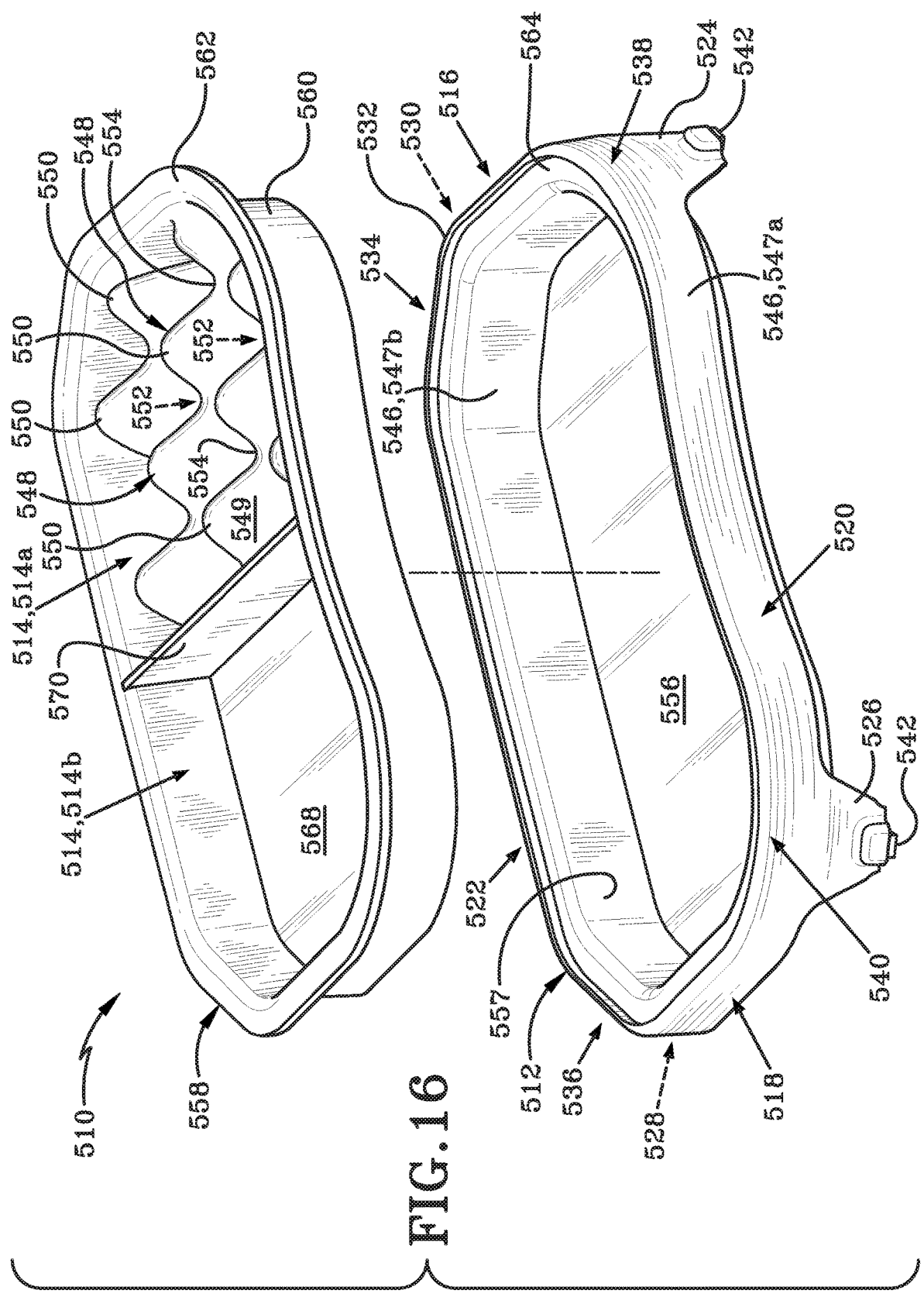

ELONGATED SLOW FEEDING DEVICE

CROSS-REFERENCE TO RELATED APPLICATION

This application claims the benefit of U.S. Provisional Application Ser. No. 62/644,106, filed Mar. 16, 2018, the entire disclosure of which is incorporated herein by reference.

TECHNICAL FIELD

The present disclosure relates generally to a feeding device for animals. More particularly, the present disclosure relates to a slow feeding device. Specifically, the present disclosure relates to a feed bowl having a bottom wall configured to form a plurality of discrete, non-continuous feeding compartments that are each capable of receiving a small quantity of food therein; where the feeding compartments are separated from each other by upstanding obstructions that prevent an animal from pushing food from one feeding compartment to another and thereby physically slows down a feeding speed of an animal using the device.

BACKGROUND INFORMATION

Some animals commonly kept as pets are known to be opportunistic, voracious eaters. Some cats and dogs are known to bolt down food at a rapid rate that may cause the animal to choke. Rapid food consumption may also cause indigestion that can result in symptoms, such as bloat or vomiting, after eating a meal. This phenomenon is common enough in cats for veterinarians to have coined the phrase "scarf and barf" to describe cats that have a tendency to eat rapidly and then throw up.

In the past, rapid eating may have provided a survival advantage because animals are vulnerable during feeding and food supplies tended to be intermittent. Eating rapidly may, therefore, have reduced an animal's exposure to danger and helped to ensure the animal received sufficient food. In domestic environments, however, rapid feeding is unnecessary as animals kept as pets typically get regular meals and are at little to no risk from predators. In domestic pets, feeding rapidly may actually negatively impact an animal's health in that the behavior may cause gastrointestinal distress and/or excess weight gain.

A number of solutions have been proposed in the prior art to address accelerated consumption rates by pets. One of these solutions is a type of feeding bowl that has obstructions which extend upwardly into the bowl's cavity from the upper surface of the bottom wall. These obstructions tend to force the pet to carefully move their snout around within the cavity to find morsels of food prior to consuming them. The idea behind this design is that the obstructions slow down the rate of feeding. One such device is disclosed in U.S. Design Pat. No. D563,608 to Kitchen. A second such related device is disclosed in U.S. Patent Publication No. 2006/0213447 also to Kitchen. These two references show a round feeding bowl with three discrete obstructions or obstacles extending inwardly into the bowl's cavity from the bottom wall. The obstructions in the two references have different configurations. These bowls tend to fall short of the desired outcome for a number of reasons. Even though the obstructions tend to get in the pet's way, it does not take long for the animal to learn to push all the food along the bottom wall and into one location. Once the food is in the single location, the pet will tend to eat at speeds close to their feeding rate when utilizing unobstructed bowls. At best, these prior art solutions may only slightly reduce the pet's feeding speed relative to that when unobstructed bowls are utilized.

The prior art bowls may have other disadvantages in that they tend create tight spacing and acute angles between the interior surface of the bowl that defines the cavity and the upstanding obstructions. This arrangement may cause painful and/or uncomfortable feeding experiences for the animal and this problem may be amplified for larger animals or for dog breeds with extremely short snouts, i.e., flat-faced breeds such as pugs, or animals with larger or wider snouts. Prior art bowls may also have the disadvantage of being able to be easily pushed around a floor surface and along walls during feeding, particularly by dogs that are aggressive eaters. Typically food bowls are placed alongside water bowls. When the animal is feeding aggressively and moving their food bowl around, the moving food bowl may knock into the water bowl, spilling water onto the floor surface. The spilled water may accumulate around the food bowl and water bowl and may result in water rings and marks being made on the floor surface. If the floor surface is hardwood for example, these water rings may damage the appearance of the flooring.

SUMMARY

The feeding device disclosed herein addresses some of the issues experienced with prior art bowls. The presently disclosed feeding device tends to slow down the rate of feeding by providing small discrete feeding compartments that are not connected to each other by a continuous, flat bottom wall. Furthermore, each feeding compartment is separated from adjacent feeding compartments by upstanding obstructions. The separate feeding compartments and obstructions are arranged in a plurality of undulations that are formed by gently curved peaks, valleys, and troughs. The undulating configuration of the bottom wall is such that the animal is unable to push food from one feeding compartment to the next. In particular, the configuration of the bottom wall does not permit an animal to maneuver their food and push it into a single pile and then feed in their normal manner at substantially their normal rapid feeding rate. Instead, the animal has to separately access the smaller quantities of food retained in each of the plurality of smaller feeding compartments and is therefore forced to eat the food in smaller, discrete quantities. The upstanding obstructions that separate adjacent compartments force the animal to work to get at the food in any particular feeding compartment. The gentle curves of the undulations do not cause pain or discomfort to the animal while feeding. This makes the feeding device disclosed herein particularly useful for flat-faced breeds that have shorter snouts, or for animals that have larger or wider snouts. The bottom wall configuration therefore permanently slows an animal's feeding rate from this slow feeding device relative to feeding rates when utilizing prior art devices.

The feeding device is also able to be raised a distance above the floor surface upon which the device rests by an extension base and/or by a set of leg extenders that may be engaged with the feeding device or with the extension base. Raising the feeding device a distance off the floor surface with the extension base tends to help animals with complex digestive issues as it allows the animal to position its head in a better position for feeding and swallowing. Leg extenders may be engaged with the legs of the feeding device or the extension base to raise the bottom wall of the feeding device even further from the floor surface.

The slow feeding device in accordance with the present disclosure therefore provides the pet with a safer, more comfortable feeding environment, regardless of an animals' physiology. The system potentially presents the feeding animal with a different meal layout at each feeding session while increasing stability and safety of the feeding device during feeding events.

The feeding device of the present disclosure also has an elongated, generally rectangular shape with truncated corners. This shape enables the feeding device to be placed against a wall or into a corner. As a consequence, the feeding device will tend to remain in that location during feeding. The elongate, rectangular shape therefore helps the animal eat in one set location instead of migrating across the floor and around the room. The shape of the feeding device disclosed herein is in sharp contrast to prior art bowls that tended to be circular in shape and therefore often were easily "rolled" along walls and moved across floor surfaces during feeding.

In one aspect, the present disclosure may provide a feeding device comprising a base including a bottom wall; and a plurality of feeding compartments defined by the bottom wall; wherein the plurality of feeding compartments are spaced a distance apart from each other; and wherein each of the plurality of feeding compartments is adapted to hold a portion of a quantity of food therein. The base of the feeding device further includes a sidewall extending upwardly from the bottom wall; and wherein the bottom wall and sidewall bound and define a feeding chamber; and wherein the plurality of feeding compartments are located within the feeding chamber.

In another aspect, the plurality of feeding compartments includes a first feeding compartment and a second feeding compartment that is adjacent the first feeding compartment; and wherein the feeding device further comprises at least one obstruction located between the first feeding compartment and the second feeding compartment; wherein the at least one obstruction is adapted to prevent food from moving between the first compartment and the second compartment. The at least one obstruction extends for a distance upwardly from the bottom wall and between the first feeding compartment and the second feeding compartment. At least a part of the bottom wall is shaped into one or more sinuous waves. Each of the one or more sinuous waves includes alternating peaks and troughs; and wherein each of the plurality of feeding compartments is formed at least partially by one of the troughs. The peaks of the one or more sinuous waves form an obstruction that extends upwardly between adjacent feeding compartments of the plurality of feeding compartments; and the obstruction is adapted to prevent movement of food from one of the plurality of feeding compartments to another. The feeding device further comprises one or more legs extending downwardly from the base; wherein the one or more legs are adapted to support the bottom wall at a first height above a surface upon which the one or more legs rest.

In yet another aspect, the base of the feeding device is generally rectangular when viewed from above. The base further includes a sidewall extending upwardly from the bottom wall; and wherein the sidewall is generally rectangular when viewed from above and includes a front, a back opposed to the front; and a first side and a second side extending between the front and back; and wherein a corner is formed where each of the front and the back meets the first side and the second side; and wherein each corner is truncated. The front and the back are of a first length and the first side and the second side are of a second length; and the first length is greater than the second length. The feeding device further comprises an extension base having a sidewall and one or more legs extending downwardly from the sidewall; wherein the extension base is configured to nest with the base; and wherein the extension base is adapted to raise the base a first distance above a surface upon which the legs of the extension base rest. The feeding device may further comprise a leg extender configured to operatively engage with each one of the one or more legs of the extension base; wherein the leg extenders are adapted to raise the extension base a further distance above the surface and to thereby raise the base to a second distance from the surface upon which the leg extenders rest.

In yet another aspect, a part of the bottom wall of the base is free of the plurality of feeding compartments; and a partition separates the part of the bottom wall that is free of the plurality of feeding compartments from a part of the bottom wall that includes the plurality of feeding compartments. The feeding device may further comprise a housing defining a cavity therein; and wherein the base comprises a liner that is removable received within the cavity of the housing.

In another aspect, the present disclosure may provide a method of feeding an animal comprising providing a feeding device having a bottom wall with a plurality of feeding compartments therein, wherein the plurality of feeding compartments are discrete and spaced apart from each other; placing a portion of a quantity of food into one or more of the plurality of feeding compartments; placing the feeding device within reach of an animal to be fed; substantially preventing the animal, during feeding, from moving some of the portion of the quantity of food from a first feeding compartment of the plurality of feeding compartments to a second feeding compartment of the plurality of feeding compartments. The step of substantially preventing includes positioning an obstruction between the first feeding compartment and the second feeding compartment. The step of providing comprises forming at least a portion of the bottom wall into one or more sinuous waves having alternating peaks and troughs; wherein each trough forms at least part of one of the plurality of feeding compartments.

In yet another aspect, the method may further comprise raising the plurality of feeding compartments a distance above a surface upon which the feeding device rests. The step of raising includes extending one or more legs downwardly from the base of the feeding device; and resting a terminal end of each of the one or more legs on the surface. The step of raising further includes positioning an extension base beneath the base of the feeding device; wherein the extension base includes one or more extension base legs; and placing a terminal end of each of the one or more extension base legs in contact with the surface; and raising the terminal end of each of the one or more legs of the base a distance off the surface. The step of raising further includes engaging a leg extender with one of each of the one or more legs of the base; and each of the one or more extension base legs.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a front elevation view thereof.

FIG. 5 is a left side elevation view thereof. A right side elevation view of the slow feeding device is a mirror image of the left side elevation view.

FIG. 7 is first cross-section of the slow feeding device taken along line 7-7 of FIG. 2.

FIG. 8 is a second cross-section of the slow feeding device taken along line 8-8 of FIG. 2.

FIG. 9A is a longitudinal cross-section of the slow feed blow taken along line 9A-9A of FIG. 2.

FIG. 9B is substantially identical to the longitudinal cross-sectional view of FIG. 9A but shows pieces of food distributed across various discrete, spaced-apart compartments that form the bottom of the slow feeding device.

FIG. 11 is a top, left, front, perspective view of the slow feeding device of FIG. 10 showing extensions engaged with the base.

FIG. 16 is an exploded top, left, front, perspective view of the slow feeding device of FIG. 15 that is selectively engageable in a separate base.

Similar numbers refer to similar parts throughout the drawings.

DETAILED DESCRIPTION

With reference to FIGS. 1-9B, a slow feeding device in accordance with an aspect of the present disclosure is indicated at 10 (hereinafter referred to as "slow feeding device 10" or "feeding device 10"). Feeding device 10 includes a base 12 that defines a feeding chamber 14 and a plurality of individual feeding compartments 15 are defined in feeding chamber 14, as will be later described herein.

Feeding device 10 may be fabricated from plastic, metal, wood, or any other rigid or semi-rigid material suitable for retaining pet food therein. According to one aspect, base 12 may be fabricated by rotationally molding, extrusion molding, blow molding, or injection molding plastic. According to another aspect, base 12 may be thermoformed from plastic.

Figure 2:
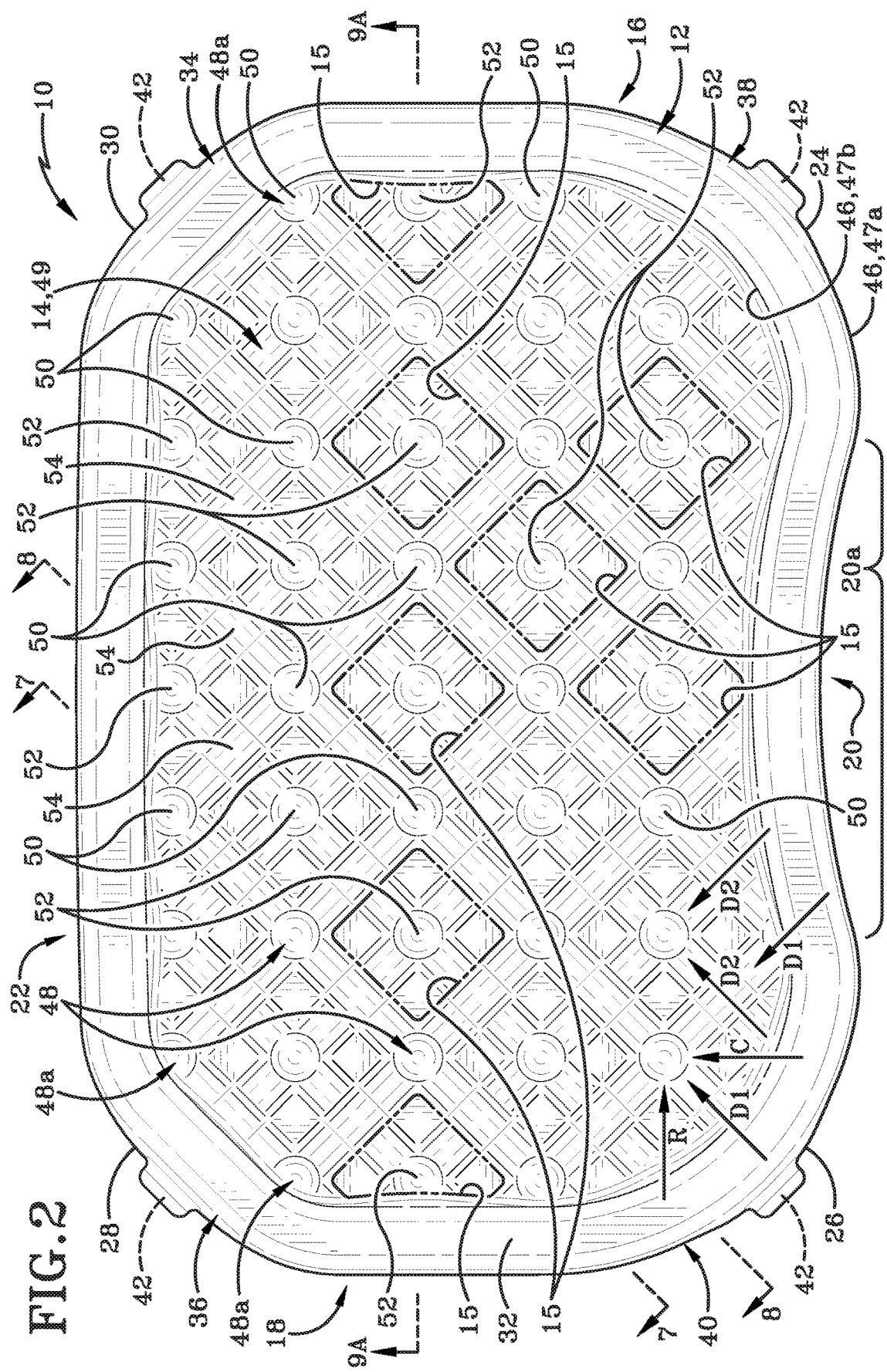
FIG. 2 is a top plan view thereof.

Base 12 includes a sidewall 46 that has a first end 16, a second end 18, a front 20, and a back 22. First and second ends 16, 18 of base 12 define a longitudinal direction therebetween. Front and back 20, 22 of base 12 define a transverse direction therebetween. As best seen in FIG. 2, sidewall 46 of base 12 may be of an elongate, generally rectangular shape when viewed from above. According to one aspect, first and second ends 16, 18 and/or front and back 20, 22 may be substantially straight. First and second ends 16, 18 may be oriented substantially parallel to one another. Likewise, front and back 20, 22 may be oriented substantially parallel to one another. First and second ends 16, 18 may be substantially perpendicular to front and back 20, 22. Front 20 may have a slight inwardly-curved region 20a that allows an animal easier access to feeding chamber 14.

Sidewall 46 may comprise an interior section 47a and an exterior section 47b that are spaced a distance away from each other and are connected along their upper ends by a wall that comprises an upper edge or rim 32 of base 12. Rim 32 forms a part of an upper region of each of the first and second ends 16, 18 and front and back 20, 22. Sidewall 46 may further include a number of internal stiffening ribs 33 (FIG. 3) that extend between the exterior section 47a and the interior section 47b of sidewall 46. An interior surface of interior section 47a (which encompasses interior surfaces of each of first and second ends 16, 18 and front and back 20, 22) along with a bottom wall 49 of base 12 (which will be further discussed herein) bounds and defines feeding chamber 14. Bottom wall 49 is configured to include a plurality of undulations that interact with each other to form the plurality of separate feeding compartments 15. The configuration of bottom wall 49 will be further described later herein.

Sidewall 46 of base 12 may further include a first corner 34, a second corner 36, a third corner 38, and a fourth corner 40. First corner 34 may be located between first end 16 and back 22 and may be oriented generally at forty-five degrees relative to each of first end 16 and back 22. Second corner 36 may be located between second end 18 and back 22 and may likewise be oriented generally at forty-five degrees relative to each of second end 18 and back 22. Each of first corner 34 and second corner 36 may be chamfered. This configuration may allow first corner 34 and/or second corner 36 to abut one or both walls of an interior corner of a room should an animal push feeding device 10 across a floor surface and into the room's corner. The chamfered nature of first and second corners 34, 36 may further allow the slow feeing device 10 to be placed diagonally in an interior corner of a room to prevent an animal from pushing device 10 around the floor of the room during feeding.

Third corner 38 of sidewall 46 of base 12 may be located between first end 16 and front 20 and may be oriented generally at forty-five degrees relative to each of first end 16 and front 20. Fourth corner 40 may be located between second end 18 and back 22 and may be oriented generally at forty-five degrees relative to each of second end 18 and back 22. Each of third corner 38 and fourth corner 40 may be chamfered in a similar fashion to first corner 34 and second corner 36 and may be used in a similar manner to reduce the possibility of the pet pushing the device 10 around a floor surface.

First and second corners 34, 36 are longitudinally spaced apart from each other along back 22 and third and fourth corners 38, 40 are longitudinally spaced apart from each other along front 20. Curved region 20a is located between third and fourth corners 38, 40. First corner 34 and third corner 38 are laterally spaced apart from each other along first end 16. Second corner 36 and fourth corner 40 are laterally spaced apart from each other along second end 18.

With continued reference to FIGS. 1-9B, sidewall 46 may be retained a distance above a floor surface upon which the feeding device 10 rests by a first leg 24, a second leg 26, a third leg 28, and a fourth leg 30. First, second, third, and fourth legs 24-30 may be integrally formed with and extend a distance generally vertically downward from a bottom region of sidewall 46, particularly from a bottom region of exterior section 47b thereof. More particularly, each of the first, second, third, and fourth legs 24, 26, 28, 30 may extend downwardly from one of the first, second, third, and fourth corners 34, 36, 38, 40 of sidewall 46 of base 12.

Each of the first leg 24, second leg 26, third leg 28, and fourth leg 30 may be of substantially the same length such that the overall height "H" (FIG. 1) of the slow feeding device 10 is substantially uniform or consistent relative to the floor surface. The height "H" may be measured from rim 32 to a bottom end of an associated one of first, second, third or fourth leg 24, 26, 28, 30. In other instances, the height "h" may be measured from rim 32 to a bottom end of a pad 42 provided at a bottom of each leg 24, 26, 28, 30. (According to one aspect, height "H" may be approximately 2.75 inches.) Pads 42 may be provided on legs 24-30 in order to help keep base 12 from sliding across the floor surface during feeding. Pad 42 may be of a smaller width and length than the bottom end of the associated leg 24, 26, 28, 30. This arrangement results in only a relatively small surface area of legs 24-30 contacting the floor surface. The small surface areas of the pads 42 tends to make it harder for a pet to push feeding device 10 across the floor surface during feeding, particularly if the material used to fabricate pad 42 is a non-skid material. Suitable materials for pads 42 includes but is not limited to rubber, rubberized plastic, silicone rubber, or any other material having non-skid properties. If pads 42 are fabricated from such non-skid materials, it is even harder for an animal to push feeding device 10 across the floor surface.

The spacing between adjacent legs, both lengthwise (from first end 16 to second end 18) and widthwise (from front 20 to back 22) helps to suspend sidewall 46 of base 12 a distance off of the floor surface while maintaining minimal contact with the floor surface through the pads 42. This arrangement introduces additional stability into slow feeding device 10 by keeping the center of gravity of base 12 as lower to the floor surface as possible. Pads 42 may also help to ensure that feeding device 10 is less likely to form a ring or similar markings on the floor surface upon which feeding device 10 rests if the animal spills water from an adjacent water bowl. Feeding device 10 presents a stable, wide-stanced device that is not easily knocked over during feeding.

As indicated earlier herein, feeding chamber 14 is bounded and defined by an interior surface of interior section 47b of sidewall 46 and bottom wall 49. Interior section 47b of sidewall 46 may be generally vertical or slightly angled into the feeding chamber 14 and may extend downwardly from rim 32 for a distance less than height "H" of base 12.

Figure 1:
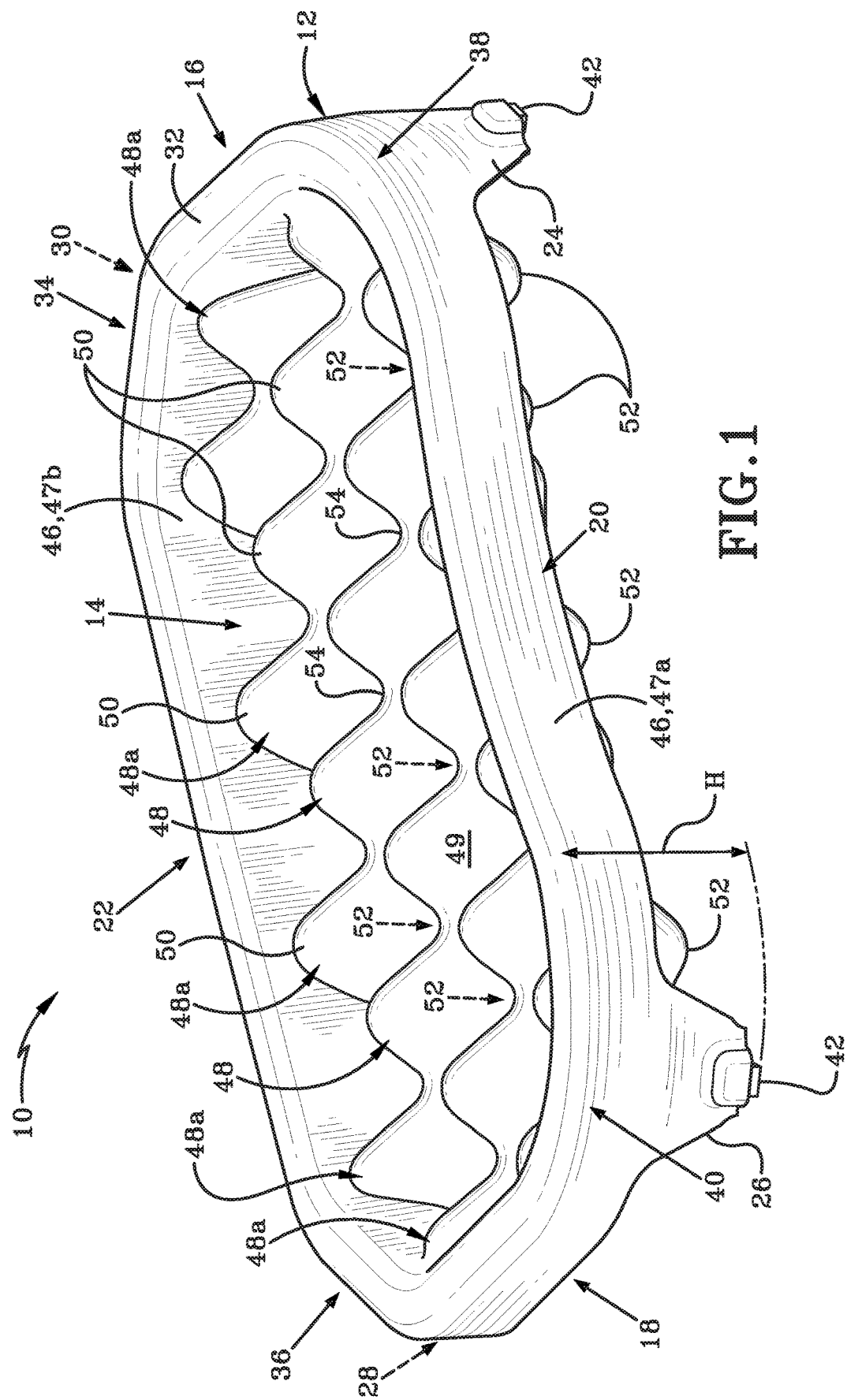
FIG. 1 is a top, left, front, perspective view of an elongated slow feeding device in accordance with an aspect of the present disclosure.

With continued reference to FIGS. 1-6, bottom wall 49 of base 12 is formed into a plurality of undulations that are arranged in such a manner that substantially no portion of bottom wall 49 is generally flat and oriented substantially horizontally. Instead, bottom wall 49 includes regions that resemble sine waves that are arranged in a series of rows, columns, and/or diagonals. Each sine wave has alternating peaks 50 and valleys 54 or troughs 52. Valleys 54 may be shallower than troughs 52. The overall effect of the undulations in bottom wall 49 is that the region appears convoluted in a similar manner to acoustic foam or egg cartons. The convoluted bottom wall comprises a repeating pattern of peaks 50 and valleys 54 or troughs 52. One sine wave may comprise a repeating pattern of peaks 50 and valleys 54 while another sine wave may comprise a repeating pattern of peaks 50 and troughs 52. Adjacent peaks 50 are separated from each other by a valley 54 or by a trough 52. The distance between proximate peaks 50 is generally the same as the distance between proximate valleys 54. The distance between proximate peaks 50 is also generally the same distance between proximate troughs 52. This can be seen in FIGS. 9A and 9B. As is evident from FIGS. 1, 3, and 6, the undulated or convoluted design of bottom wall 49 appears substantially the same when viewed from the top or bottom of feeding device 10. In reality, the bottom wall 49 when viewed from the bottom of feeding device 10 is a mirror image of the bottom wall when viewed from the top of feeding device 10. For example, a peak 50 may rise upwards from feeding chamber 14 when feeding device 10 is in an upright, use position, as shown in FIG. 1. That same peak 50 may be oriented downwardly when feeding device 10 is viewed from below and therefore have the appearance of being a trough. This can be seen in FIGS. 3 and 6.

Bottom wall 49 as shown in the attached figures may, however, be described as being substantially non-continuous, meaning that bottom wall 49 is not a horizontally oriented, flat surface that extends generally from first side 16 to second side 18, and/or from front 20 to back 22. Instead, as illustrated in the figures, the sine waves in bottom wall 49 are arranged in one or more rows (R), columns (C), and/or diagonals (D).

Figure 3:
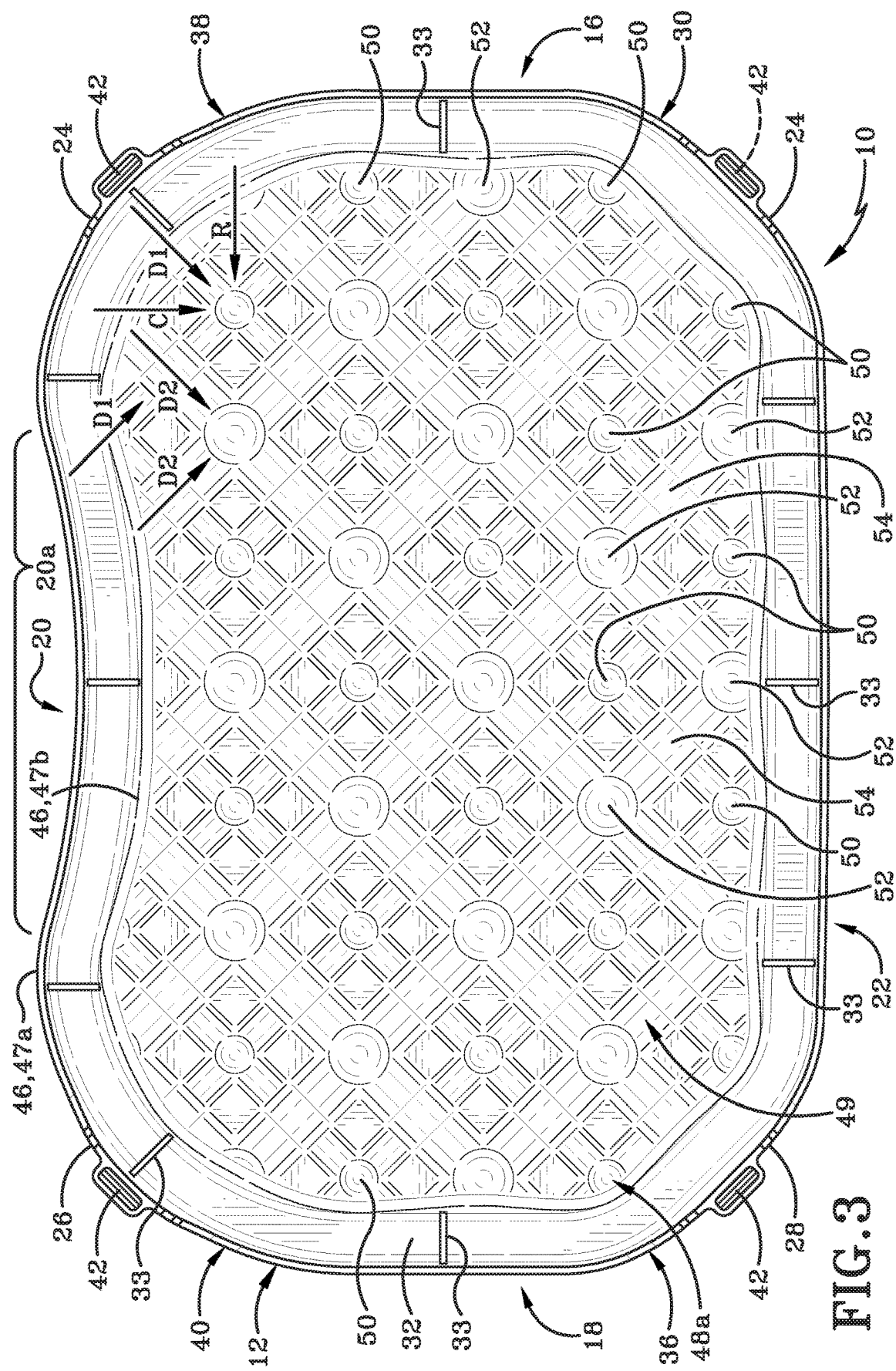
FIG. 3 is a bottom plan view thereof.

The undulating sine waves of bottom wall 49 may be arranged such that the plurality of rows (R), columns (C), and diagonals (D) form a generally regular pattern within feeding chamber 14. This is best seen in FIGS. 2 and 3. Each row (R) may extend longitudinally within feeding chamber 14, between the first and second ends 16, 18 of base 12. Each row (R) comprises a plurality of alternating peaks 50 and troughs 52 such that each peak 50 is separated from the adjacent peak 50 by an intervening trough 52. Each column (C) may extend transversely within feeding chamber 14, between the front and back 20, 22 of base 12. Each column (C) comprises a plurality of alternating peaks 50 and troughs 52 such that each peak 50 is separated from the adjacent peak 50 by an intervening trough 52. Diagonals (D) may extend across feeding chamber 14 at angle, such as angling between one of the first and second ends 16, 18 and the front or back 20, 22. Diagonals (D) may include a first type of diagonal indicated as (D1) and a second type of diagonal indicated as (D2). Diagonals (D1) are comprised of a series of alternating peaks 50 and valleys 54 such that each peak 50 is separated from the adjacent peak 50 by an intervening valley 54. Diagonals (D2) are formed from a series of alternating peaks 50 and troughs 52 such that each peak 50 is separated from the adjacent peak 50 by an intervening trough 52.

Further according to this pattern, each of the rows (R), columns (C), and diagonals (D) may take a sinusoidal waveform, as best seen in FIGS. 7 and 8, such that each row (R), column (C), and diagonal (D), appears similar to a sine wave. The intersection of each of these sinusoidal rows (R), columns (C), and diagonals (D) provides a generally even distribution of peaks 50, troughs 52, and valleys 54 across non-continuous bottom wall 49 of feeding chamber 14.

The distribution of peaks 50, troughs 52, and valleys 54 across bottom wall 49 forms a plurality of separate, spaced-apart individual bowl-like feeding compartments 15 (see FIG. 2) within feeding chamber 15. In particular, the arrangement of the various rows (R), columns (C) and diagonals (D) may provide that two or more troughs 52 intersect each other to form one of the feeding compartments 15; and that the intersecting two or more troughs are circumscribed or bounded by four spaced-apart sets of two or more intersecting peaks 50. The plurality of sinuous waves forming the bottom wall are oriented in multiple directions relative to each other and intersect each other in such a way as to form three-dimensional peaks 50, troughs 52 and valleys 54. The three-dimensional peaks form obstructions 48 (FIG. 1) that separate adjacent feeding compartments from each other as will be discussed below. The three-dimensional troughs 52 form the feeding compartments. In particular, the intersecting peaks 50 form obstructions 48 that extend upwardly for a distance above the adjacent feeding compartment 15. Peaks 50 that are located near the interior portion 47b of sidewall 46 of feeding chamber 14 may only partially form obstructions 48, i.e., they from incomplete obstructions. An example of such an incomplete obstruction may be best seen in FIG. 1, numbered as obstruction 48a. In a similar fashion, partial troughs 52 that intersect interior portion 47b of sidewall 46 may form incomplete feeding compartments that may not hold the same quantity of food 72 (FIG. 9B) as other feeding compartments. Incomplete obstructions 48a and incomplete feeding compartments still make it relatively difficult for a pet to feed from the adjacent complete or incomplete feeding compartment 15.

Figure 6:
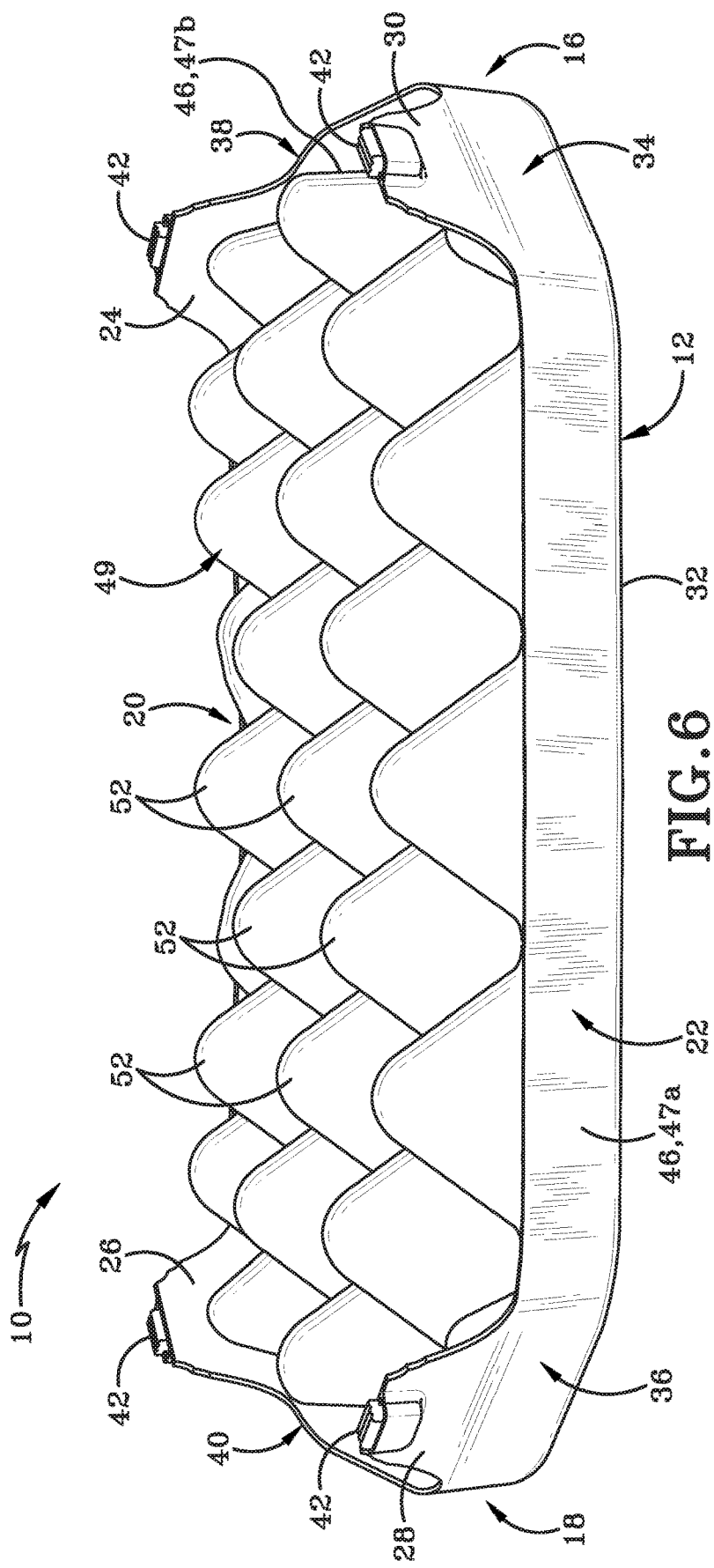
FIG. 6 is a bottom, right, rear perspective view of the slow feeding device of FIG. 1.

With reference to FIGS. 4-9A, various views feeding device 10 are provided that illustrate the undulating nature of bottom wall 49. FIGS. 4 and 5 show a front and side elevation view of feeding device 10, respectively, while FIG. 6 shows a bottom, rear, perspective view thereof. FIGS. 7, 8, and 9A show cross-sections of slow feeding device 10 as taken along lines 7-7 and 8-8 of FIG. 1; and 9A-9A of FIG. 2. These cross-sections further illustrate the relationships between peaks 50, troughs 52, and valleys 54 and the sinusoidal waveforms that comprise bottom wall 49. Specifically, it may be seen that peaks 50 are raised a distance above troughs 52, with valleys 54 located intermediate between peaks 50 and troughs 52. In other words, valleys 54 are located physically between peaks 50 and troughs 52 and are also located at a height that is somewhere between the height of peaks 50 and a depth of troughs 52. Valleys 54 may separate adjacent peaks 50 from each other. Valleys 54 may also separate adjacent troughs 52 from each other.

According to one aspect, bottom wall 49 may be configured to form somewhere between twenty and third individual compartments 15. As illustrated, bottom wall 49 forms around twenty-five individual compartments 15 within feeding chamber 14. It will be understood, however, that the size and number of the peaks 50, troughs 52, valleys 54, and feeding compartments 15 may be different from what is illustrated and discussed herein.

It should further be noted that the sinuous waveforms that comprise bottom wall 49 are shaped in such a way that there are no sharp edges, no acute angles, and no tight spaces formed in bottom wall 49 itself or between bottom wall 49 and sidewall 46. The gently curved undulations help to ensure that an animal eating food from feeding device 10 will not tend to experience discomfort or injury while eating. This is because the smooth, continuous shapes of the peaks 50, troughs 52, and valleys 54 tend not to create pinch points for an animal to injure its snout or tongue.

In accordance with an aspect of the present disclosure, and as may be seen from FIG. 9B, feeding compartments 15 are not in communication with one another. In other words, each individual feeding compartment 15 is separated from adjacent feeding compartments 15 by obstructions 48 that extend upwardly for a distance above the lowermost regions of troughs 52. The compartments 15 are not considered to be continuous because food cannot be moved by the animal's tongue or snout from one compartment 15 to the next. Instead, each individual feeding compartment 15 receives and holds a smaller portion of an animal's overall meal therein. FIG. 9B, from example, shows morsels of food 72 in a plurality of discrete spaced-apart feeding compartments 15. This arrangement forces the animal to separately eat the smaller portions of food 72 from the plurality of feeding compartments 15 and therefore slows their rate of feeding down. The animal is substantially prevented from moving food 72 from one compartment 15 to another because the peaks 48 and valleys 54 get in their way. In other words, the animal is not completely unable to move some of the food 72 from one compartment 15 to another but attempts to easily push or herd food into one location in the feeding device 10 are made more difficult for the animal because the obstructions 48 get in the way of doing this. Some food might make it from one compartment to the next but this is not easily accomplished. So, unlike prior art bowls that included discrete obstructions extending upwardly from a flat and continuous bottom wall, the animal cannot move their food within feeding device 10 to a single location and then eat at their normal rate.

Additionally, the obstructions 48 that extend upwardly into feeding cavity 14 tend to interfere with the animal reaching food 72 held in an adjacent feeding compartments 15. This again tends to slow down the rate of feeding from feeding device 10.

Still further, the undulating gentle curves of the obstructions 48 and troughs 52 ensure that the animal is not hurt during feeding. The gentle curves also serve the purpose of causing stray morsels of food 72 to slide back downwardly into the feeding compartments 15. This again forces the pet to only be able to access food in discrete, spaced apart compartments 15 that are only capable of holding a small quantity of food instead of being able to move the food from one location to another within feeding device 10.

According to one aspect, the use of multiple individual feeding compartments 15 may further allow for random distribution of pieces of food 72 when an owner places food in the feeding device 10. The pattern of food 72 retained in compartments 15 and the small quantities of food 72 retained in each compartment 15 will change from one meal to another. From the animal's perspective, the difference in food distribution from one meal to the next tends to keep the feeding device 10 more interesting than was the case with prior art bowls. Contrast this with prior art bowls that have a single feeding chamber with a continuous bottom wall and it will be readily apparent that slow feeding device 10 may remain effective at slowing feeding rates over time while prior art bowls failed to do so.

In other examples, not illustrated herein, the upper surface of the bottom wall of feeding device 10 may form undulations when feeding device 10 is viewed from above but the lower surface of bottom wall may be configured to be substantially smooth, non-undulating, and horizontal when feeding device 10 is viewed from below.

Figure 10:
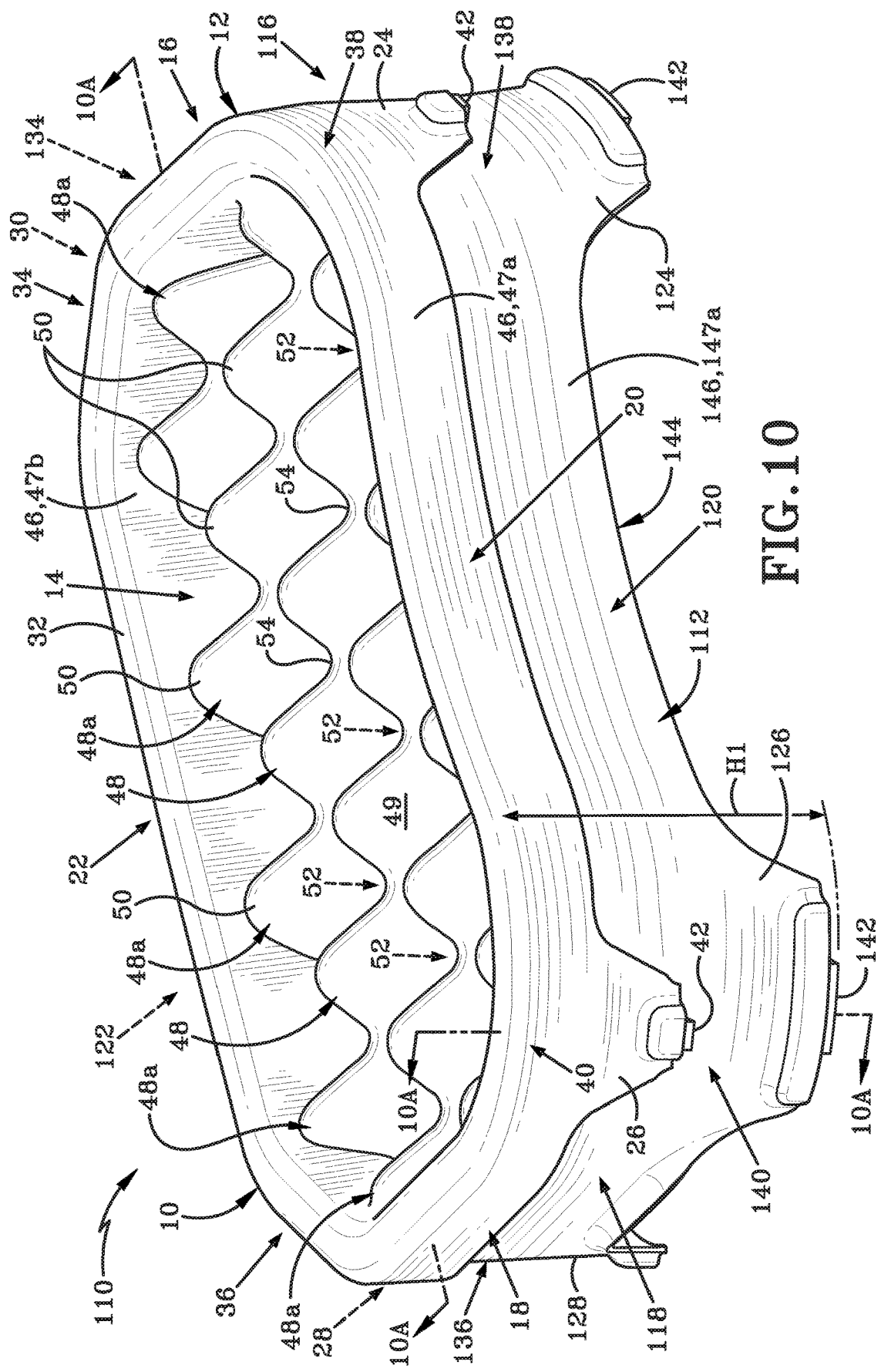
FIG. 10 is a top, left, front, perspective view of the elongated slow feeding device of FIG. 1 engaged on a base to raise the height of the discrete compartments relative to a floor surface upon which the base sits.
Figure 10A:
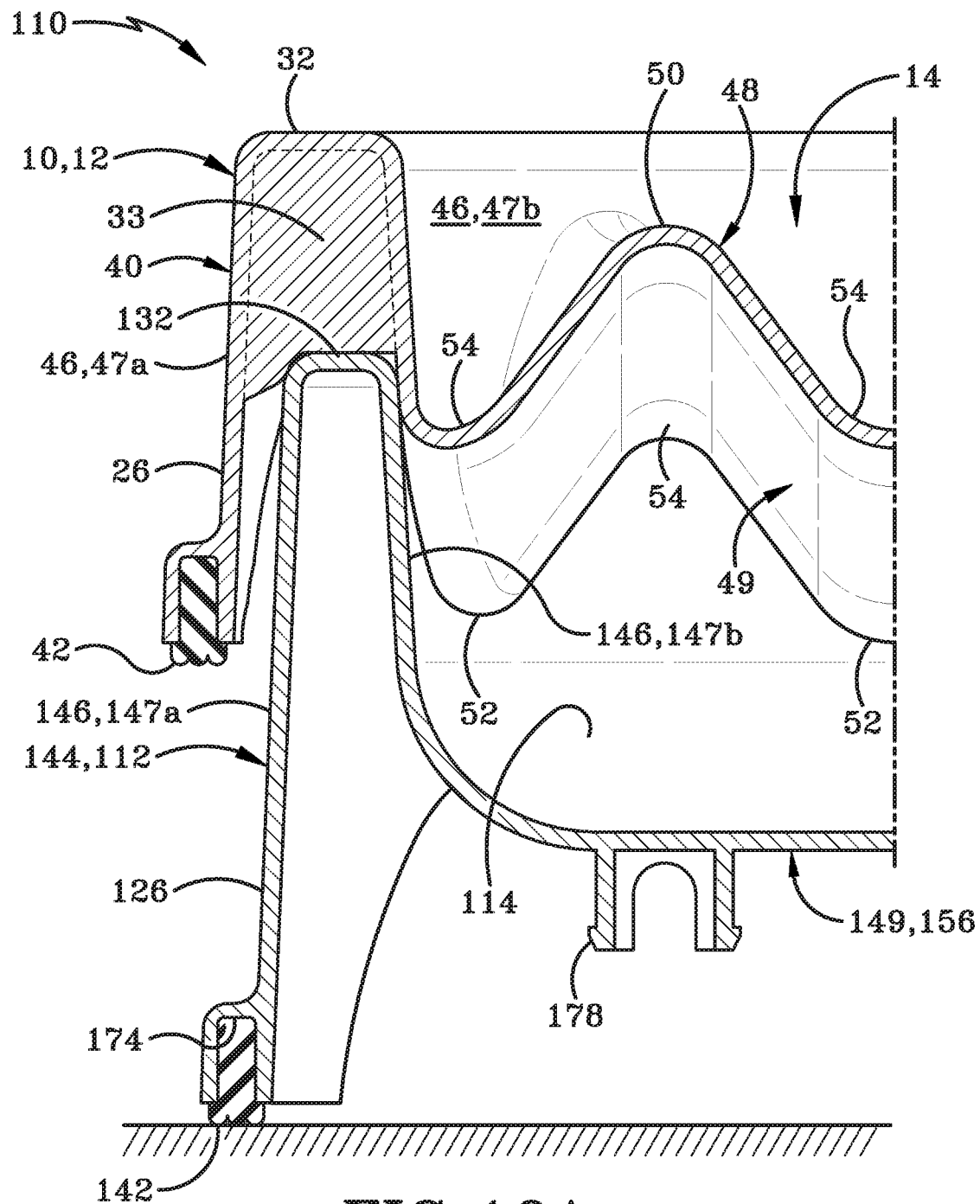
FIG. 10A is a cross-section of a single leg of the base of the slow feeding device when engaged with the extension base.

With reference now to FIGS. 10 and 10A there is shown a second embodiment of a feeding device 110 in accordance with an aspect of the present disclosure. Feeding device 110 comprises the feeding device 10 of FIG. 1 plus an extension base 144 that is selectively positionable under feeding device 10 to raise the height of bottom wall 49 relative to a floor surface. Feeding device 10 has been disclosed and discussed above and therefore will not be further discussed with respect to the second embodiment, except where relevant.

Extension base comprises a housing 112 having a sidewall 146 comprised of an exterior section 147a and an interior section 147b that are connected to each other by an upper rim 132 (FIG. 10a). Extension base 144 has an overall shape that is substantially similar to the overall shape of base 12 in that base 144 is generally rectangular when viewed from above. Although only partially shown in the attached figures, it should be understood that extension base 144 includes angled corners 134, 136, 138, 140 that are similar in shape and size to corners 34, 36, 38, 40 of feeding device 10. Sidewall 146 of extension base 144 also includes a first and second end 116, 118 and a front and back 120, 122 that are substantially identical to first and second end 156, 18, and front and back 20, 22.

Similar to base 12, extension base 144 may be fabricated from plastic, metal, wood, or any other rigid or semi-rigid material suitable for holding food or water therein. Similar to base 12, extension base 144 may be rotationally molded, extrusion molded, injection molded, or may be thermoformed.

Extension base 144 differs from base 12 in that the bottom wall 149 (FIG. 10A) does not include any undulations but is, instead, substantially horizontally, oriented and substantially planar. Consequently, sidewall 146 and bottom wall 149 may bound and define a cavity 114 that does not include any obstructions correlating to obstructions 48. Instead, cavity 114 of extension base 144 may have a smooth interior surface 156 that extends between first and second ends 116, 118 and between front and back 120, 122. In other words, bottom wall 149 and sidewall 146 form a substantially continuous, single cavity 114.

A first leg 124, a second leg 126, a third leg 128, and a fourth leg 130 are integrally formed with sidewall, particularly with exterior section 147a thereof. First, second, third and fourth legs 124-130 extend downwardly from sidewall 146 in the same manner that legs 24, 26, 28, and 30 extend downward from exterior section 47a of sidewall 46 of base 12. First, second, third, and fourth legs 124-130 are of a slightly greater width than first, second, third and fourth legs 24-30 of feeding device 10.

Extension base 144 may further include a set of nonskid pads 142. Each pad 142 is placed in a recess 174 (FIG. 10A) defined in a terminal end of one of the first, second, third, and fourth legs 124, 126, 128, 130. Pads 142 are substantially similar in structure and function to nonskid pads 42 of base 12 except pads 142 may be of a greater length than pads 42 because of the difference in the widths of the associated legs.

FIG. 10A also shows that a latching member 178 extends downwardly from an exterior surface of bottom wall 149 of extension base 144 a distance inwardly from each recess 174 and leg 124, 126, 128, 130. Each latching member 178 may has upstanding lips which are spaced a distance away from the exterior surface of bottom wall 149. Latching members 178 will be further discussed later herein.

Extension base 144 may be sized to nest within a space defined by a bottom region of sidewall 46 and legs 24, 26, 28, 30 of feeding device 10. Base 12 and extension base 144 may be interlocked to form a single raised feeding device 110. FIG. 10A shows one end of base 12 interlocked with extension base 144. When base 12 and extension base 144 are so engaged, ribs 33 of base 12 rest on upper rim 132 of extension base 144. Cavity 114 is located vertically beneath bottom wall 49 of base 12 and a portion of the undulating bottom wall 49 is received within cavity 114. According to this aspect, and as shown in FIG. 10A, troughs 52 of feeding chamber 14 may extend downwardly into cavity 114, however, troughs 52 may be suspended above and may not contact smooth interior surface 156 of cavity 114. The substantially similar structure of base 12 and extension base 144 ensures the combined feeding device 110 has strength and stability.

Extension base 144 is engaged with base 12 in order to raise feeding device 10 an additional distance away from the floor surface relative to feeding device 10 on its own. As shown in FIG. 10, extension base 144 in conjunction with base 12 raises the height of the rim 32 of feeding device to a height "H1" from the floor surface, wherein "H1" is greater than "H". According to one aspect, height "H1" may be approximately 5 inches. As discussed earlier herein, it has been shown that raising the height of a feeding dish may also have additional health and/or digestive benefits for the animal, such as improving their feeding posture. This raised height 'H1' in conjunction with the provision of the individual compartments 15 in bottom wall 49 of feeding device 10, may therefore serve to reduce the pet's feeding rate, improve their feeding posture, and thereby increasing the overall digestive health and wellbeing of the animal.

Similar to base 12, the provision of pads 142 on extension base 144 also reduces the size of the contact points with the floor surface and thereby aids in reducing and/or eliminating rings or marks left on the floor surface if water spills around the pads 142 from an adjacent water bowl.

Once feeding device 10 has been placed on top of extension base 144, food 72 may be introduced into the multiple feeding compartments 15 of feeding device 10 as previously described herein. As indicated above, the multiple feeding compartments 15 in conjunction with the raising of the height of those feeding compartments utilizing extension base 144 will aid in slowing the animal's speed of eating.

The overall time that an animal takes to eat, even if slowed down, is periodic and relatively short. Thus, according to one aspect, when feeding device 10 is not needed for food, feeding device 10 may be disengaged from extension base 144. Cavity 114 of extension base 144 may then be used for the remainder of the day as a water dish. According to this aspect, cavity 114 of extension base 144 may be configured to hold in excess of one US Gallon of water when extension base 144 is not nested with feeding device 10. According to another aspect, cavity 114 may have a liquid capacity of approximately 160 fluid ounces.

Figure 12:
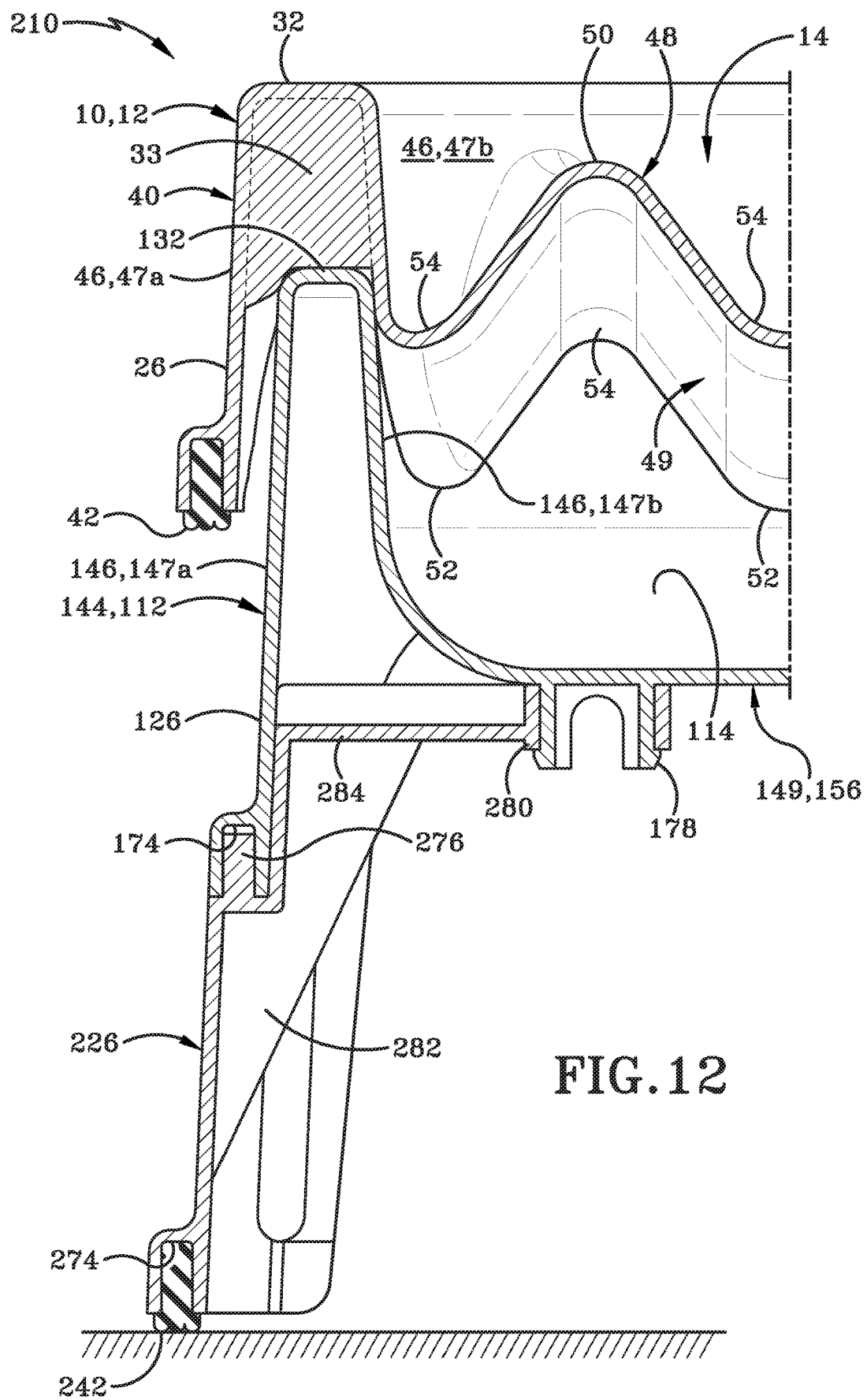
FIG. 12 is a cross-section of a single leg of the slow feeding device when engaged with the base and an extension, where the cross-section is taken along line 12-12 of FIG. 11.

With reference to FIGS. 11 and 12, there is shown a third embodiment of a feeding device in accordance with an aspect of the present disclosure, generally indicated at 210.

Feeding device 210 is comprised of the feeding device 110 (FIGS. 10 and 10A) plus a plurality of leg extenders that are engaged with extension base 144. Specifically, feeding device 310 may include a first leg extender 224, a second leg extender 226, a third leg extender 228, and a fourth leg extender 230 that may be selectively engaged with legs 124, 126, 128, 130 of extension base 144. Each leg extender 224, 226, 228, 230 may be of a width and length that is greater than the width and length of the legs 124, 126, 128, 130 of extension base 144. Each leg extender 224, 226, 228, 230 is configured to interlock or mate with a lower region of an associated one of the legs 124, 126, 128 and 130 of extension base 144.

Leg extenders 224, 226, 228, 230 may be fabricated from the same materials as extension base 144 and feeding device 10. As best seen in FIG. 12, leg extenders 224, 226, 228, and 230 may each define a recess 274 in a terminal end thereof. Recess 274 is configured to accept the non-skid pad 142 from extension base 144 therein. Pad 142 may be detached from the similar recess 174 defined in the terminal end of one of legs 124, 126, 128, 130 and the pad 142 may then be placed into recess 274. Recesses 174 that used to include pads 142 receive a projection 276 that extends upwardly from one of the leg extenders, such as leg extender 226 shown in FIG. 12. Projection 276 is sized and configured to be received into recesses 174 and a portion of body 282 of the associated one of the leg extenders 224, 226, 228, and 230 is shaped to abut a portion of the terminal end and the back of the associated one of legs 124, 126, 128, and 130. Body 282 of the leg extender may include an arm 284 extending horizontally along a top region thereof. Arm 284 may terminate with a latching receiver 280 that is complementary configured to engage the latching member 178 extending downwardly from the exterior surface of bottom wall 149 of extension base 144. According to one aspect, latching member 178 and latching receiver 280 may allow leg extenders 224, 226, 228, and 230 to snap-fit into place under extension base 144.

According to another aspect, the interior side of legs 124, 126, 128, and 130 may further define a channel (not shown) that may facilitate the attachment of leg extenders 224, 226, 228, and 230 to the associated legs 124, 126, 128, 130 of extension base 144. For example, legs 124, 126, 128, and 130 may each define a channel that may receive a projection that extends outwardly from an associated leg extender 224, 226, 228, and 230. According to one aspect, the channel may be oriented vertically, allowing leg extenders 224, 226, 228, and 230 to slide vertically into place relative to legs 124, 126, 128, 130, respectively before latching receiver 280 of arm 284 engages latching member 178. According to another aspect, channel may be horizontally oriented and may allow leg extenders 224, 226, 228, and 230 to slide horizontally into place before latching receiver 280 engages latching member 178.

According to another aspect, each of leg extenders 224, 226, 228, and 230 may be pivotally engaged with an associated one of legs 124, 126, 128, and 130 via some type of hinge (not shown). The hinges may allow leg extenders 224, 226, 228, and 230 to rotate up and underneath bottom wall 149 of extension base 144, when leg extenders 224, 226, 228, 230 are not in use. According to this aspect, leg extenders 224, 226, 228, and 230 may be hingedly engaged with the interior side of legs 124, 126, 128, 130 and may rotate to a stowed position under extension base 144 when not in use. Further according to this aspect, when leg extenders 224, 226, 228, and 230 are rotated into the stowed position, projection 276 may disengage recess 174 to allow for replacement of non-skid pads 142 therein.

According to another aspect which is not illustrated herein, leg extenders 224, 226, 228, and 230 may be of a type that are height adjustable or that include telescoping portions to increase or decrease the height by which slow feeding device 10 is able to be raised off of the floor surface. By way of non-limiting example, leg extenders 224, 226, 228, and 230 may have a first and second portion wherein first portion is larger than second portion and is configured to accept the second portion within a bore of the first portion. The second portion may then be selectively slid into and out of first portion in order to vary the overall length of leg extenders 224, 226, 228, and 230. The height may be increased by a distance traversed by second portion outwardly from the first portion.

According to one aspect, the height adjustable first and second portions may further include a latching mechanism to secure the first and second portions in an extended position relative to each other. According to another aspect, the first and second portions may include a latching mechanism to secure the first and second portions in a retracted position relative to each other. According to another aspect, the first and second portions may include multiple latching mechanisms to secure the first and second portions in multiple extended or retracted positions relative to each other.

According to another aspect, legs 24, 26, 28, and 30 may be configured to be complementary configured to directly secure leg extenders 224, 226, 228, and 230 thereto instead of the leg extenders being engaged with extension base 144 and then feeding device being nested beneath feeding device 10. In order to accomplish the direct engagement of leg extenders 224, 226, 228, and 230 with feeding device 10, legs 24, 26, 28, 30 may be configured in any of the ways discussed above with respect to legs 124, 126, 128, and 130. It will be understood that although leg extenders 224, 226, 228, and 230 have been described herein as being attachable with extension base 144 (or feeding device 10) in various ways, there may be other suitable ways of engaging leg extenders to feeding device 10 or to feeding device 110 and these are contemplated to fall within the scope of the present disclosure.

Leg extenders 224, 226, 228, 230 may raise slow feeding device 10 to a height "H2" relative to the floor surface. This height "H2" is greater than either of the height "H" or the height "H1". This further raising of feeding device 10 relative to the floor surface has the tendency to place slow feeding device 10 into a better feeding position for taller animals or for more voracious feeders. According to one aspect, height "H2" may be approximately 7.5 inches. (It will be understood that if extension base 144 is omitted and leg extenders 224, 226, 228, and 230 are directly engaged with feeding device 10, the height "H2" will be somewhat reduced.

As indicated earlier herein, it has been shown that, for animals with certain digestive problems, causing the animal to eat slower and raising the animal's feeding bowl a distance off the floor surface may help to address digestive problems. The raised height 'H2' provided by extension base 144 and leg extenders 224, 225, 228, 230, in conjunction with the plurality of individual compartments 15 formed in bottom wall 49 of base 12 may provide a raised, slow feeder that is particularly useful for feeding taller animals with digestive issues. Further, the ability to adjust between heights "H", "H1", and "H2" may provide a customizable fit for any particular breed of dog, or for multi-dog households, for example, and to address the particular needs of a specific animal using feeding device 10.

Figure 13:
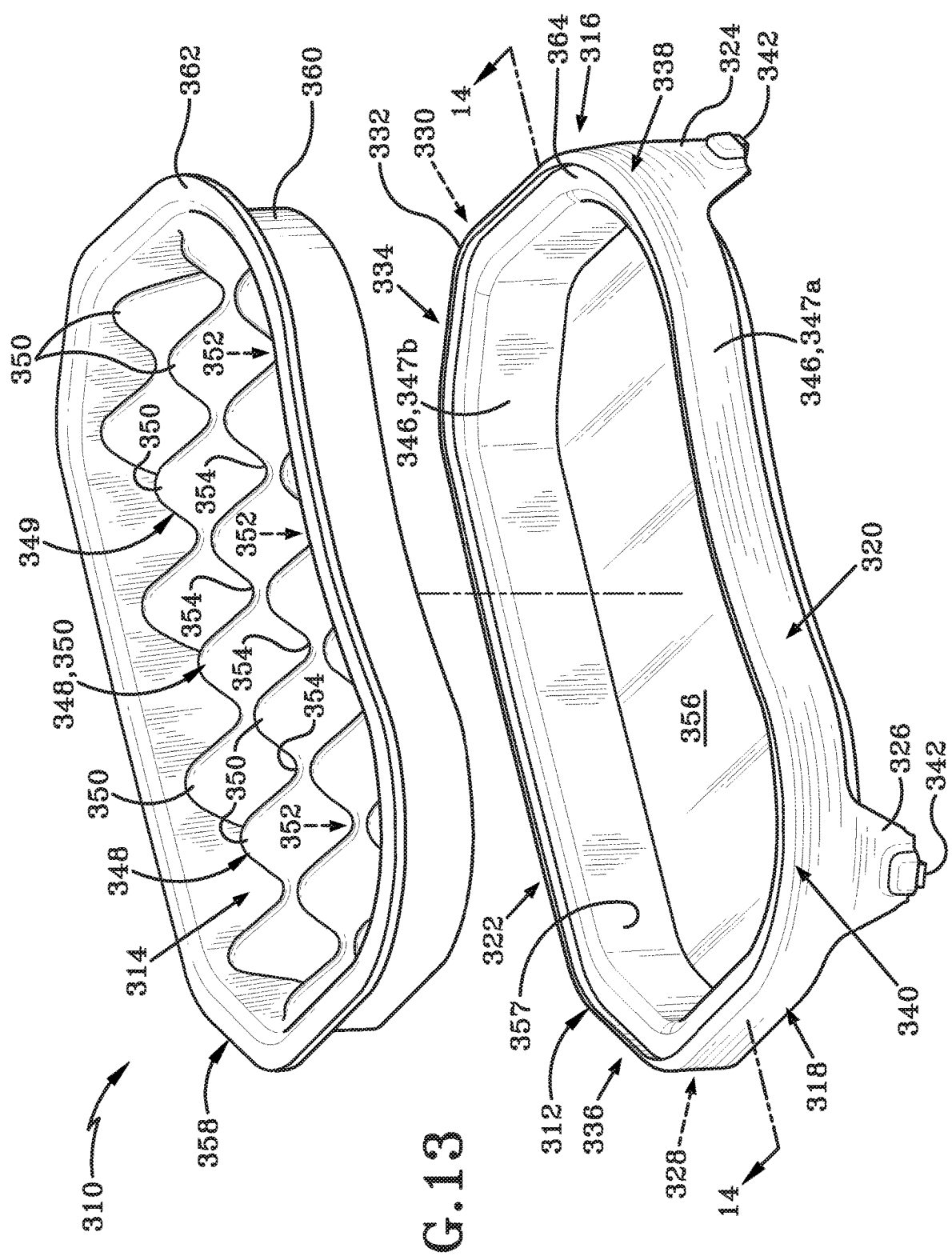
FIG. 13 is an exploded top, left, front, perspective view of a second embodiment of a slow feeding device in accordance with an aspect of the present disclosure.
Figure 14:
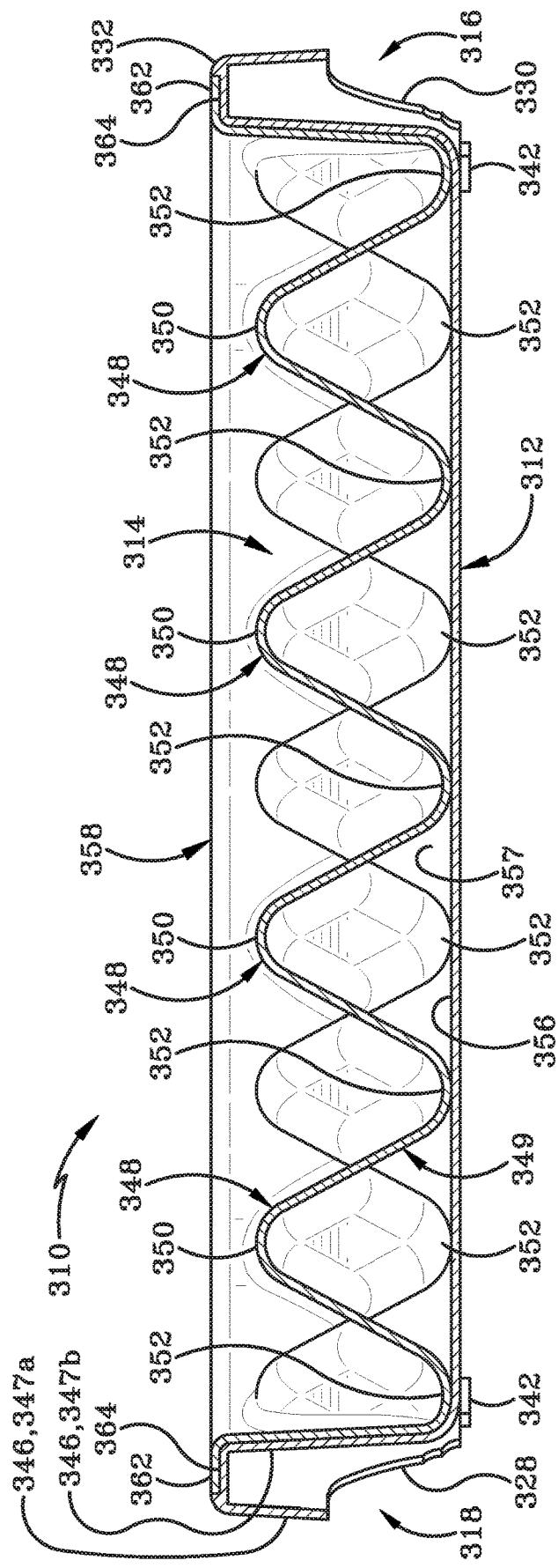
FIG. 14 is a longitudinal cross-section of the slow feeding device of FIG. 13 taken along line 14-14 of FIG. 13.

With reference to FIGS. 13 and 14, a fourth embodiment of a slow feeding device, indicated as 310 is shown. Feeding device 310 may comprise a housing or base 312 and a removable liner 358 that is able to nestingly engage with housing or base 312 as is illustrated in FIG. 14. Base 312 may be substantially similar to extension base 144 and may be fabricated from the same materials as extension base 144. Removable liner 358 may be fabricated from silicone rubber, plastic, or any other suitable material that is non-toxic and durable. According to one aspect, removable liner 358 may be dishwasher safe for easy cleaning and maintenance.

Base 312 is generally rectangularly-shaped when viewed from above and has angular corners. In particular, base 312 has first and second ends 316, 318, a front and 1 back 320, 322, and first, second, third, and fourth legs 324, 326, 328, 330 that extend downwardly from a sidewall 346. The sidewall 346 has an exterior section 347a and an interior section 347b that are connected together by an upper rim 332. Base 312 includes first, second, third, and fourth corners 334, 336, 338, and 340 and the legs 324, 326, 328, 330 extend downwardly from the sidewall 346 in the associated corners 334, 336, 338, 340. A non-skid pad 342 may be provided on a terminal end of each leg 324, 326, 328, and 330. Each of these aforementioned components is substantially identical in structure and function to their counterparts from extension base 144 and feeding device 10.

Base 312, differs from feeding device 10 in that the feeding chamber 14 with a plurality of undulating peaks 50, troughs 52, and valleys 54 are omitted from the bottom wall thereof, and, instead, the bottom wall of base 312 is substantially flat and horizontally oriented, having a smooth interior surface 356. In other words, base 312 substantially resembles extension base 144. Smooth interior surface 356 extends between both ends 316, 318 and the front and back 320, 322 of the interior section 347b of sidewall 346. Sidewall 346 and the interior surface of bottom wall 356 bound and define a cavity 357 that is substantially similar to the cavity 114 of extension base 144. Base 312, in this configuration, may serve as a water dish where the water is received in the cavity 357 when the liner 358 is not engaged with base 312. In other instances, if a pet does not eat at a rapid speed, base 312 may be utilized as a food dish. Base 312 will have an advantage over prior art dishes in that the elongate, rectangular shape and the angular corners 334, 336, 338, 340 will help wedge the base 312 against a wall or in a corner and prevent base 312 from being pushed around a room during feeding.

As indicated above, the fourth embodiment of feeding device 310 includes liner 358 that is selectively insertable into and removable from cavity 357 of base 312. Liner 358 includes a sidewall 360 and a bottom wall 349 that provide some strength and structure to removable liner 358. Sidewall 360 is of an elongate, generally rectangular shape when viewed from above. Sidewall 360 may also include corners that are of a substantially identical configuration to the corners of base 312. Sidewall 360 terminates in an upper lip 362 that is configured to rest upon and extend outwardly beyond rim 332 of base 312 when liner 358 is nestingly engaged within cavity 357 of base 312. At least a portion of lip 362 may be configured to sit within an indentation 364 (FIG. 14) defined in rim 332 of base 312.

Bottom wall 349 of liner 358 may be substantially identical in structure and function to bottom wall 49 of feeding device 10. As such, bottom wall 349 may include a plurality of undulations that include peaks 350, troughs 352, and valleys 354 that are substantially identical in structure and function to peaks 50, troughs 52, and valleys 54 of base 12. The undulations in bottom wall 349 define a plurality of independent, spaced-apart, non-continuous, feeding compartments similar to compartments 15. Each compartment is circumscribed by a number of obstructions 348 that make it more of a challenge for an animal to get at food in the compartment.

FIG. 14 is a cross-section of the feeding device 310 showing the liner 358 nested within the cavity 357 of base 312. It should be noted that the overall height of the peaks 350 and the depth of the troughs 352 may be reduced relative to the height of peaks 50 and depth of troughs 52. This may be done so that liner 358 may readily fit within base cavity 357 of 312. According to one aspect, troughs 352 may extend downwardly to a point that they rest on the surface 356 of the bottom wall. According to another example (not shown), peaks 250 may extend vertically upwardly above lip 362 instead of terminating a distance below lip 362 as illustrated in FIG. 14.

Figure 15:
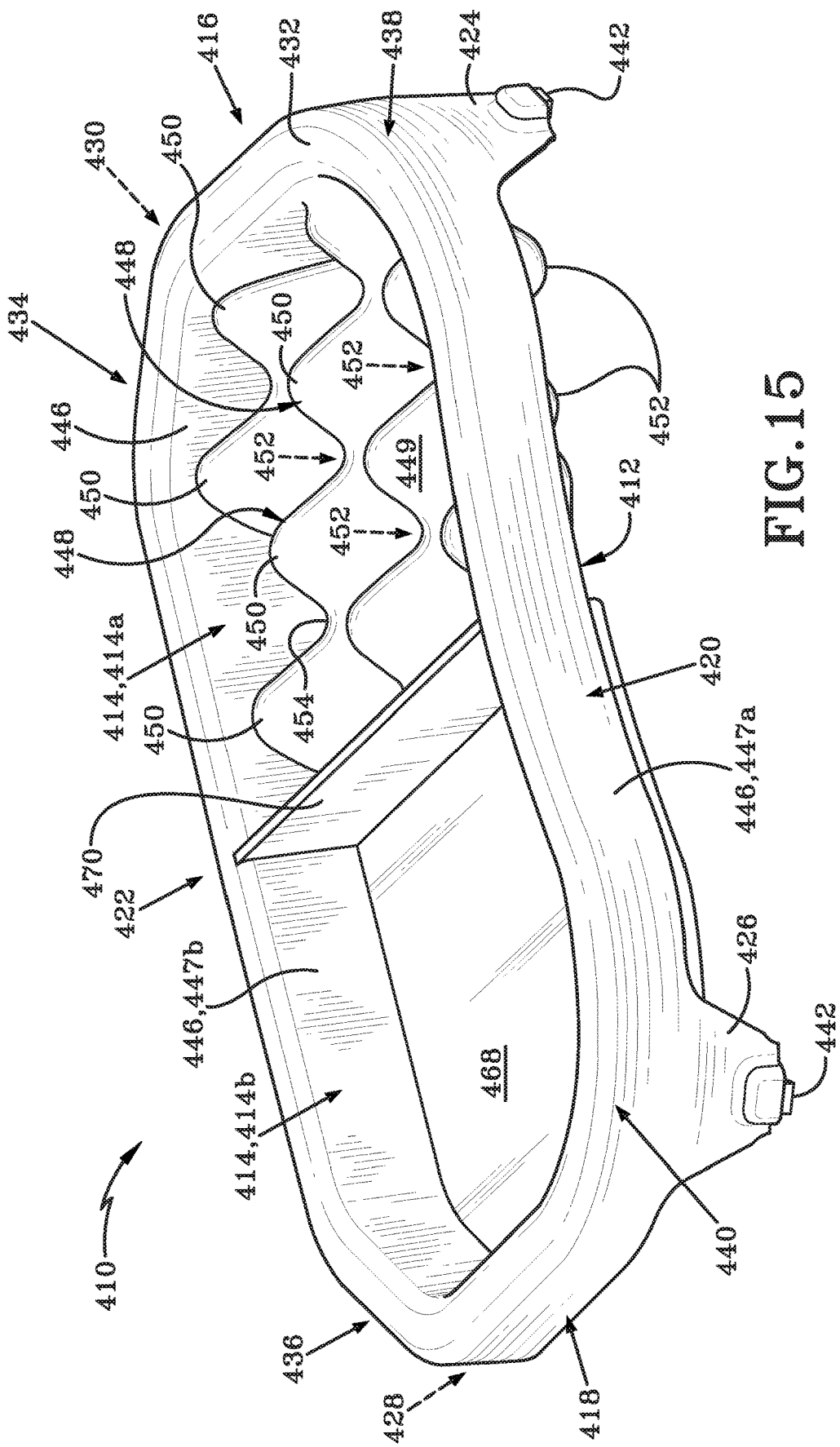
FIG. 15 is a top, left, front, perspective view of a third embodiment of a slow feeding device in accordance with an aspect of the present disclosure.

With reference to FIG. 15, a fifth embodiment of a slow feeding device is shown, generally indicated as 410. Feeding device 410 may comprise a base 412 that may be substantially similar to base 12 having first and second ends 416, 418, a front and back 420, 422, first, second, third, and fourth legs 424, 426, 428, 430, a rim 432, a sidewall 446 with an exterior section 447a and an interior section 447b, first, second, third, and fourth corners 434, 436, 438, and 440, and non-skid pads 442. Each of these components is substantially identical in structure and function to their counterparts in base 12, i.e. first and second ends 16, 18, front and back 20, 22, first, second, third and fourth legs 24, 26, 28, 30, rim 32, sidewall 46 with an exterior section 47a and an interior section 47b, first, second, third, and fourth corners 34, 36, 38, 40, and non-skid pads 42, respectively, as previously discussed herein.

According to this embodiment, base 412 differs from base 12 in that sidewall 446 is bounded and defined by the interior portion 447b of sidewall 446 and a bottom wall 449 but the bottom wall 449 is differently configured from bottom wall 49. Feeding chamber 414 may comprise a first segment 414a and a second segment 414b that are separated from each other by a partition 470. First segment 414a extends transversely between front 420 and back 422, and extends longitudinally between first end 416 and partition 470. The bottom wall 449 of the first segment 414a is configured to include undulations that form a plurality of feeding compartments 415 similar to feeding compartments 15. Specifically, bottom wall 449 is formed into a plurality of peaks 450, troughs 452, valleys 454, and obstructions 448. Peaks 450, troughs 452, valleys 454, and obstructions 448 are substantially identical in structure and function to peaks 50, troughs 52, valleys 54, and obstructions 48.

Second segment 414b, on the other hand, extends transversely between front and back 420, 422 and extends longitudinally between second end 418 and partition 470. The bottom wall 468 of second segment 414b lacks undulations and, instead, is substantially flat, horizontally oriented, and smooth.

The partition 470 may allow for food 72 to be placed in one or more of the feeding compartments formed by the undulating bottom wall 449. Water may be placed in the flat bottomed second segment 414b.

As indicated above, first segment 414a is substantially identical in structure and function to feeding chamber 14 of base 12 except that the first segment 414a is of reduced dimensions relative to feeding chamber 14. In particular, first segment 414a may occupy around one half of the longitudinal length of base 412. The second segment 414b may occupy the rest of the longitudinal length of base 412.

Although base 412 is illustrated in FIG. 15 with undulating peaks 450, troughs 452, valleys 454, and obstructions 448 positioned to the right side of partition 470, and the smooth bottom wall 468 and side wall 447b to the left side of partition 470, when viewing base 412 from front 420, it will be understood that this configuration may be reversed in other instances.

With reference to FIG. 16, a sixth embodiment of a slow feeding device, indicated as 510, is shown. Feeding device 510 may have a base 512 that may be substantially identical in structure and function to base 312. Base 512 may therefore be generally rectangular when viewed from above, with first and second ends 516, 518, a front and a back 520, 522, first, second, third, and fourth legs 524, 526, 528, 530, a rim 532, a sidewall 546 with an exterior section 547a and an interior section 547b, first, second, third, and fourth corners 534, 536, 538, and 540, and non-skid pads 542. Each of these components is substantially identical in structure and function to their counterparts in base 312, i.e. first and second ends 316, 318, front and back 320, 322, first, second, third and fourth legs 324, 326, 328, 330, rim 332, sidewall 346 with an exterior section 347a and an interior section 347b, first, second, third, and fourth corners 334, 336, 338, 340, and non-skid pads 342, respectively, as previously discussed herein. Base 512 may have a sidewall 546 and a bottom wall having an interior surface 556 that bounds and defines cavity 557. The interior surface 556 may be smooth, flat, and generally horizontally oriented, and may extend between first and second ends 516, 518, and between front 520 and back 522. Cavity 557 may be substantially similar to the cavity 314 and may be configured to receive a liner 558 in a similar fashion to the way line 358 is received in cavity 357 of base 314. (When not being used to receive liner 558, base 512 may be used as a water dish or a feed dish for animals that eat at a substantially normal pace.)

Removable liner 558 is configured to nestingly be received within cavity 557 in much the same way as line 358 is received in cavity 357. Liner 558 includes a bottom wall and a sidewall 560 with an upper lip 562. Sidewall 560 may provide strength and structure to liner 558 and is shaped to be complementary to interior section 547b of sidewall 546 and bottom wall 556. Lip 562 may be configured to sit within an indentation 564 formed in rim 532 of base 512.

Liner 558 differs from liner 358 in that a feeding chamber 514 may be defined in liner 558 that substantially has the same structure and function as feeding chamber 414. In other words, feeding chamber 514 is divided into a first segment 514a and a second segment 514b by a partition 570. First segment 514a may defined by a part of the interior section 547b of sidewall 560 and an undulating bottom wall 549. Bottom wall 549 extends transversely between front and back 520, 522 and longitudinally between first end 516 and partition 570. Bottom wall 549 comprises a plurality of undulations that define multiple feeding compartments similar to feeding compartments 15. The undulations include peaks 550, troughs 552, valleys 554, and obstructions that are similar to peaks 450, troughs 452, valleys 454, and obstructions 448.

Second segment 514b is defined by a part of the interior section 547b of sidewall 560 and a smooth, substantially planar, and horizontally oriented bottom wall 568. Bottom wall 568 extends transversely between front and back 520, 522 and longitudinally between second end 518 and partition 570. As with the fifth embodiment, partition 570 may allow for food 72 to be placed in the multiple compartments in the first segment 414a and may allow for water to be placed in the second segment 414b. It should be noted that according to this embodiment, peaks 550, troughs 552, and obstructions 548 may be slightly reduced in height and depth to fit within base 512 in a similar manner to the way peaks 350, troughs 352, and obstructions 348 are of smaller dimensions in order to fit within base 512. Alternatively, the dimension of one or more of the peaks 350, 550 troughs 352, 552 and obstructions 348, 548 in these liner-type embodiments may be reduced or increased proportionally.

Similar to liner 358, removable liner 558 may be formed of silicone rubber, plastic, or any other suitable material that is non-toxic and durable. According to one aspect, removable liner 558 may be dishwasher safe for easy cleaning and maintenance.

According to another aspect, removable liner 358 and removable 558 may be interchangeable with each other without deviating from the scope of the disclosure herein.

It will be understood that the configuration of obstructions 48 need not be limited to the convoluted design as discussed herein, but may take other patterns or distributions within the feeding chamber 14 without deviating from the scope of the disclosure provided herein.

Having thus described the various components and features of the slow feeding device 10 and various exemplary embodiments thereof, the operation of the slow feeding device 10 and a method of use therefor will now be discussed.

A method of using a slow feeding device in accordance with the present disclosure will be described with reference to feeding device 10 but should be understood to apply to all of the various embodiment disclosed herein.

The method may include adjusting a height of feeding device 10 to a height that is appropriate relative to the animal that is to eat from feeding device 10. This may include placing the terminal ends of the legs 24, 26, 28, 30 of base 12 directly on a floor surface to keep feeding device 10 at height "H" if the animal is relatively small. Alternatively, adjusting the height may include nesting the extension base 144 within base 12 to raise feeding device to height "H1" if the animal is taller, and/or is a more aggressive feeder, and/or has digestive issues. Furthermore, feeding device 10 may be raised to height "H2" through installation and/or deployment of leg extenders 224, 225, 228, 230 as previously described herein. The leg extenders may be used if the animal is even taller, and/or is an even more aggressive feeder, and/or has digestive issues.

Once feeding device is at the proper height, a plurality of food morsels 72 may be placed into the feeding chamber 14 such that the food 72 is distributed into more than one of the feeding compartments 15. According to one aspect, food 72 may be placed and distributed substantially evenly throughout all feeding compartments 15. According to another aspect, food 72 may be randomly placed and distributed in any number of the feeding compartments 15. The amount of food placed in some feeding compartments 15 may be greater or less than the amounts placed in other compartments 15. Some feeding compartments 15 may be left empty. According to these aspects, the amount of food 72 placed in each individual compartment 15 may vary from feed to feed, or may vary according to the dietary needs of the particular animal being fed.

Once food 72 is deposited into feeding compartments 15 of feeding chamber 14, the feeding device 10 may be placed in a location where it is accessible to the animal being fed. With reference to FIGS. 2 and 3, the overall rectangular shape with chamfered first and second corners 34 and 36 (and/or chamfered third and fourth corners 38, 40) allows maximum variability of placement of slow feeding device 10 when in use. Specifically, by way on non-limiting examples, feeding device 10 may be placed away from walls or other objects in the room as a stand-alone feeding device 10. Alternatively, the elongated front and back 20, 22 allow feeding device 10 to be placed against a room's wall or against other similar structures, such as a kitchen island. By placing the back 22 of feeding device 10 against a room's wall, the elongate, rectangular shape of slow feeding device 10 tends to hinder the animal pushing the feeding device 10 across the floor surface. Additionally, the elongate, rectangular shape of feeding device 10 prevents the pet from "rolling" the feeding device 10 along the room's wall, as was possible with previously known round food bowls. The curved region 20a in the front 20 of feeding device 10 permits easy access to the feeding chamber 14. In other instances, first and/or second ends 16, 18 of feeding device may be placed alongside a room's wall or other structures to similarly limit lateral movement of the device 10 across the floor surface.

According to one aspect, slow feeding device 10 may be placed in a corner of the room where two walls intersect. In particular, one of first or second ends 16, 18 may be placed alongside one wall while back 22 is placed alongside the adjoining wall. This placement may limit both forward movement and lateral movement of feeding device 10 while in use.

According to another aspect, feeding device 10 may be placed in a corner of the room where two room walls intersect, with the feeding device 10 being position at an angle by utilizing the chamfered first and second corners 34, 36. The first and second corners 34, 36 may be placed against the two room walls that form the corner. This placement may further limit lateral movement of the feeding device 10 in either direction while simultaneously limiting forward movement during use.

First corner 34, substantially straight back 22, and second corner 36 further allow slow feeding device 10 to be placed at the base of a room wall or in a corner in order to help prevent tip-over of slow feeding device 10 during use. This may reduce spills and/or accidents during eating. Further, the elongated, rectangular shape of feeding device 10 allows for storage of the device along a room wall or in a corner and this keeps slow feeding device 10 from becoming a tripping hazard when not in use.

Once placed in the desired position, the animal may then be permitted to begin eating the food 72 placed in the smaller feeding compartments 15. The obstructions 48 surrounding the smaller feeding compartment 15 from which the animal is trying to eat will tend to cause the animal to slow its consumption rate of food as the animal has to work at reaching the food 72. As the animal eats, it is prevented from moving the food around within the feeding chamber 14 from compartment 15 to compartment in order to try and push the food all into one location. The peaks 50, troughs 52, and valleys 54 combine to make it necessary for the animal to search for each individual food-containing feeding compartment 15 and to eat from only one of the individual feeding compartments 15 at a time. The obstructions 48 interfere slightly with the navigation through the feeding chamber 14, and the animal has to eat smaller quantities of food 72 from multiple, discrete, and smaller compartments 15 that are not in communication with each other. Thus, the animal's feeding rate is reduced, and coupled with the raised height, certain negative digestive symptoms may be relieved and/or eliminated.

As discussed in regards to the methods and operations herein, components with like names are to be understood to refer to all embodiments of the slow feeding device 10, 310, 410, and/or 510 as previously described. To reduce confusion and solely for purposes of clarity and brevity, reference numerals for like components in alternative embodiments may not be recited and only the first embodiment's components and numbering will be referred to hereafter. It will be therefore understood that the operation described hereinafter may apply equally to all embodiments as if fully recited herein, unless specifically stated otherwise.

As indicated earlier herein, in operation, feeding device 10 is contemplated to allow a pet owner to place pieces of food 72 at random within the plurality of feeding compartments 15. As the distribution of food may be randomized and/or adjusted with each feed, no two feeding events need be identical. This randomization prevents an animal from developing a navigation strategy for rapid feeding from the slow feeding device 10. The configuration of slow feeding device 10 therefore maintains its effectiveness over time because the animal is required to "hunt" around each individual obstruction 48 and to move over and between peaks 50 and valleys 54 to feed from the smaller feeding compartments 15. This need to progressively move from one feeding compartment to the next in order to eat small portions of food 72 tends to slow the animal's speed of eating down. Because the peaks 50, troughs 52, and valleys 54 do not present any sharp edges, acute angles, and tight spaces but instead present gently undulating curved regions, animals feeding from feeding device 10 are unlikely to experience discomfort or injury while eating.

According to embodiments shown in FIGS. 15 and 16, a pet owner may place food in the compartment of feeding chamber 414, 514 containing obstructions 448, 558 while placing water in the opposite compartment of feeding chamber 414, 514.

When in use, the elongated shape of slow feeding device 10 provides additional stability even when raised a distance away from the floor surface using extension base 144 and/or leg extenders 224, 225, 228, 230. The stability is the result of the size, placement, and distance between the four opposing legs 24, 26, 28, 30 and the corresponding non-skid pads 42. Additionally, the elongated shape of base 12 provides more longitudinal length than horizontal width thereby reducing the distance an animal needs to reach to feed thereby making all areas of feeding chamber 14 accessible without the need for the animal to move its position relative to the feeding device 10. The curved region 20a on base 12 provides even closer access for a feeding animal. Thus feeding chamber 14 is easily accessible to an animal during a feeding event.

It will be understood that the inclusion of four individual legs may apply equally to all embodiments discussed herein. The use of individual legs, as opposed to resting the entire lower perimeter of the slow feeding device 10 on the floor, limits the number of contact points between the slow feeding device 10 and the floor thereby reducing and/or eliminating bowl ring stains that tend to occur when using round feeding bowls. These stains typically occur because spilled food or water collects around the bottom edge of a bowl where the bowl contacts the floor. The legs of the present device allow better air circulation around feeding device 10 and this tends to reduce or eliminate moisture buildup under the device. Additionally, food that falls under the slow feeding device 10 may easily be retrieved.

In further operation, extension base 144 may alternatively be used separately from the slow feeding device 10 as a second food bowl or water dish, as previously described herein. This may be particularly advantageous in short-term need, such as a visiting pet or pet-sitting scenario.

It will be understood that while the feeding device 10 has been disclosed herein as being generally rectangular in shape with truncated corners, feeding device 10 may, instead, be configured to be of any other desired shape when viewed from above. All of the other components, such as the extension base 144, will be configured to be complementary to the selected shape of the feeding device. For example, feeding device may be one of substantially square, substantially trapezoidal and substantially circular when viewed from above, instead of being substantially rectangular. The substantially square, trapezoidal or circularly shaped feeding device will include all other features of feeding device 10, such as having the bottom wall thereof formed in the same configuration as the bottom wall of feeding device 10, i.e., including the plurality of gently undulating obstructions that form multiple discrete feeding compartments.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various aspects of the disclosure are examples and the disclosure is not limited to the exact details shown or described.

What is claimed:

1. A feeding device comprising:
   a base including a bottom wall; wherein at least a part of the bottom wall is shaped into one or more sinuous waves and
   a plurality of feeding compartments defined by the bottom wall; wherein the plurality of feeding compartments are spaced a distance apart from each other; and wherein each of the plurality of feeding compartments is adapted to hold a portion of a quantity of food therein;
   wherein the part of the bottom wall that is shaped into one or more sinuous waves includes a plurality of sinuous waves that are oriented in multiple directions relative to each other and intersect each other in such a way as to form three-dimensional peaks and three-dimensional troughs; and the three-dimensional peaks form obstructions that separate adjacent feeding compartments from each other; and the three-dimensional troughs form the feeding compartments.

2. The feeding device according to claim 1, wherein the base further includes a sidewall extending upwardly from the bottom wall; and wherein the bottom wall and sidewall bound and define a feeding chamber; and wherein the plurality of feeding compartments are located within the feeding chamber.

3. The feeding device according to claim 1, wherein the plurality of feeding compartments includes a first feeding compartment and a second feeding compartment that is adjacent the first feeding compartment; and wherein the feeding device further comprises;
   at least one obstruction located between the first feeding compartment and the second feeding compartment; wherein the at least one obstruction is adapted to prevent food from moving between the first compartment and the second compartment.

4. The feeding device according to claim 3, wherein the at least one obstruction extends for a distance upwardly from the bottom wall and between the first feeding compartment and the second feeding compartment.

5. The feeding device according to claim 1, further comprising one or more legs extending downwardly from the base; wherein the one or more legs are adapted to support the bottom wall at a first height above a surface upon which the one or more legs rest.

6. The feeding device according to claim 1, wherein the base is generally rectangular when viewed from above.

7. The feeding device according to claim 1, wherein the base is one of substantially square, trapezoidal and circular when viewed from above.

8. The feeding device according to claim 7, wherein the front and the back are of a first length and the first side and the second side are of a second length; and the first length is greater than the second length.

9. The feeding device according to claim 1, wherein the base further includes a sidewall extending upwardly from the bottom wall; and wherein the sidewall is generally rectangular when viewed from above and includes a front, a back opposed to the front; and a first side and a second side extending between the front and back; and wherein a corner is formed where each of the front and the back meets the first side and the second side; and wherein each corner is truncated.

10. The feeding device according to claim 1, further comprising:
    an extension base having a sidewall and one or more legs extending downwardly from the sidewall; wherein the extension base is configured to nest with the base; and wherein the extension base is adapted to raise the base a first distance above a surface upon which the legs of the extension base rest.

11. The feeding device according to claim 10, further comprising a leg extender configured to operatively engage with each one of the one or more legs of the extension base; wherein the leg extenders are adapted to raise the extension base a further distance above the surface and to thereby raise the base to a second distance from the surface upon which the leg extenders rest.

12. The feeding device according to claim 1, further comprising:
a housing defining a cavity therein; and wherein the base comprises a liner that is removable received within the cavity of the housing.

13. The feeding device according to claim 1, wherein a part of the bottom wall of the base is free of the plurality of feeding compartments.

14. A feeding device comprising:
a base including a bottom wall; and
a plurality of feeding compartments defined by the bottom wall; wherein the plurality of feeding compartments are spaced a distance apart from each other; and wherein each of the plurality of feeding compartments is adapted to hold a portion of a quantity of food therein;
wherein a part of the bottom wall of the base is free of the plurality of feeding compartments; and a partition separates the part of the bottom wall that is free of the plurality of feeding compartments from a part of the bottom wall that includes the plurality of feeding compartments.

15. The feeding device according to claim 14, further comprising one or more legs extending downwardly from the base; wherein the one or more legs are adapted to support the bottom wall at a first height above a surface upon which the one or more legs rest.

16. The feeding device according to claim 14, further comprising:
an extension base having a sidewall and one or more legs extending downwardly from the sidewall; wherein the extension base is configured to nest with the base; and wherein the extension base is adapted to raise the base a first distance above a surface upon which the legs of the extension base rest.

17. The feeding device according to claim 14, further comprising:
a housing defining a cavity therein; and wherein the base comprises a liner that is removable received within the cavity of the housing.

18. A method of feeding an animal comprising:
providing a feeding device having a bottom wall with a plurality of feeding compartments therein, wherein the plurality of feeding compartments are discrete and spaced apart from each other; wherein at least a part of the bottom wall is shaped to include a plurality of sinuous waves that are oriented in multiple directions relative to each other and intersect each other in such a way as to form three-dimensional peaks and three-dimensional troughs; and the three-dimensional peaks form obstructions that separate adjacent feeding compartments from each other; and the three-dimensional troughs form the feeding compartments;
placing a portion of a quantity of food into one or more of the plurality of feeding compartments;
placing the feeding device within reach of an animal to be fed;
substantially preventing the animal, during feeding, from moving some of the portion of the quantity of food from a first feeding compartment of the plurality of feeding compartments to a second feeding compartment of the plurality of feeding compartments with the obstructions.

19. The method according to claim 18, further comprising:
raising the plurality of feeding compartments a distance above a surface upon which the feeding device rests.

20. The method according to claim 19, wherein the raising includes:
extending one or more legs downwardly from the base of the feeding device; and
resting a terminal end of each of the one or more legs on the surface.

21. The method according to claim 20, wherein the raising further includes:
positioning an extension base beneath the base of the feeding device; wherein the extension base includes one or more extension base legs;
placing a terminal end of each of the one or more extension base legs in contact with the surface; and
raising the terminal end of each of the one or more legs of the base a distance off the surface.

22. The method according to claim 21, wherein the raising further includes:
engaging a leg extender with one of:
each of the one or more legs of the base; and
each of the one or more extension base legs.

23. The method according to claim 18, wherein providing the bottom wall includes providing a part of the bottom wall that is free of the plurality of feeding compartments.

24. The method according to claim 23, further comprising providing a partition between the part of the bottom wall that is free of the plurality of feeding compartments and a part of the bottom wall that includes the plurality of feeding compartments.

* * * * *